(12) United States Patent
Kota et al.

(10) Patent No.: US 11,120,211 B2
(45) Date of Patent: Sep. 14, 2021

(54) COMBINING SPREADSHEET RECORDED OPERATIONS

(71) Applicant: Microsoft Technology Licensing, LLC, Redmond, WA (US)

(72) Inventors: Gergely Kota, Redmond, WA (US); Raul Clouse, Redmond, WA (US); Ilia Pavlov, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 9 days.

(21) Appl. No.: 16/392,017

(22) Filed: Apr. 23, 2019

(65) Prior Publication Data

US 2020/0342050 A1    Oct. 29, 2020

(51) Int. Cl.
G06F 17/10 (2006.01)
G06F 40/18 (2020.01)

(52) U.S. Cl.
CPC ................................. G06F 40/18 (2020.01)

(58) Field of Classification Search
CPC ...................................................... G06F 40/18
USPC ......................................................... 715/217
See application file for complete search history.

(56) References Cited

U.S. PATENT DOCUMENTS

| | | | | |
|---|---|---|---|---|
| 6,523,167 B1 * | 2/2003 | Ahlers | ..................... | G06F 40/18 717/100 |
| 6,640,234 B1 * | 10/2003 | Cotten | ..................... | G06F 40/18 715/219 |
| 7,467,350 B2 * | 12/2008 | Aureglia | ................. | G06F 40/18 715/218 |
| 7,814,328 B1 | 10/2010 | Leonard et al. | | |
| 8,621,340 B2 * | 12/2013 | Chirilov | ................. | G06F 40/18 715/212 |

(Continued)

FOREIGN PATENT DOCUMENTS

| | | |
|---|---|---|
| EP | 1367514 A1 | 12/2003 |
| WO | 2011020050 A2 | 2/2011 |

OTHER PUBLICATIONS

Yamani et al., Use of a Spreadsheet Program in Electromagnetics, IEEE 2001, pp. 292-297. (Year: 2001).*

(Continued)

*Primary Examiner* — Shahid K Khan
(74) *Attorney, Agent, or Firm* — Schwegman Lundberg & Woessner, P.A.

(57) ABSTRACT

Disclosed in some examples are methods, systems, devices, and machine-readable mediums for combining activities in recorded code. A method is disclosed that includes receiving a first indication of a first operation and a second indication of a second operation from an electronic document application, the first indication of the first operation indicating that the first operation is performed on a first cell of the electronic document application and the second indication of the second operation indicating the second operation is performed on a second cell. The method may include determining a range of cells expression. The method may further include generating code within the recorder application comprising the range of cells expression that when executed within the recorder application causes an operation of the same type as the first operation and the second operation to be performed by the electronic document application on the first cell and the second cell.

20 Claims, 22 Drawing Sheets

(56) References Cited

U.S. PATENT DOCUMENTS

| | | | |
|---|---|---|---|
| 8,812,625 B1* | 8/2014 | Chitilian | G06F 40/197 709/220 |
| 9,875,226 B1* | 1/2018 | Gundrum | G06F 40/18 |
| 10,572,584 B1* | 2/2020 | Karpel | G06F 21/629 |
| 2005/0027850 A1 | 2/2005 | Menzies et al. | |
| 2005/0132333 A1 | 6/2005 | Neumann et al. | |
| 2006/0005132 A1 | 1/2006 | Herdeg, III | |
| 2011/0041141 A1 | 2/2011 | Khosrowshahi et al. | |
| 2012/0330995 A1* | 12/2012 | Muenkel | G06F 16/245 707/769 |
| 2014/0372854 A1* | 12/2014 | Otero | G06F 40/18 715/219 |
| 2015/0363478 A1* | 12/2015 | Haynes | G06F 16/26 707/625 |
| 2017/0052766 A1 | 2/2017 | Garipov | |
| 2018/0157467 A1* | 6/2018 | Stachura | G06F 8/34 |
| 2018/0267940 A1* | 9/2018 | Lee | G06F 40/14 |
| 2019/0138587 A1* | 5/2019 | Silk | G06F 16/27 |
| 2020/0341740 A1 | 10/2020 | Kota et al. | |

OTHER PUBLICATIONS

"International Search Report and Written Opinion Issued in PCT Application No. PCT/US2020/025575", dated Jul. 9, 2020, 11 Pages.

"Non-Final Office Action issued in U.S. Appl. No. 16/392,092", dated Jul. 10, 2020, 31 Pages.

"Final Office Action Issued in U.S. Appl. No. 16/392,092", dated Feb. 24, 2021, 33 Pages.

Patry, et al., "End-User Programming in a Structured Dialogue Environment: the GIPSE Project", In Proceedings of IEEE Symposia on Human-Centric Computing Languages and Environments, Sep. 5, 2001, pp. 212-219.

"International Search Report and Written Opinion Issued in PCT Application No. PCT/US2020/025574", dated Jul. 1, 2020, 10 Pages.

"Non Final Office Action Issued in U.S. Appl. No. 16/392,092", dated Jun. 21, 2021, 38 Pages.

* cited by examiner

```
Sub AddSheetAndValues()
    Sheets.Add After:=ActiveSheet
    Sheets("Sheet2").Select
    Sheets("Sheet2").Name = "New sheet"
    Range("B2").Select
    ActiveCell.FormulaR1C1 = "1"
    Range("C2").Select
    ActiveCell.FormulaR1C1 = "2"
    Range("B3").Select
    ActiveCell.FormulaR1C1 = "3"
    Range("C3").Select
    ActiveCell.FormulaR1C1 = "4"
    Range("C4").Select
End Sub
```

FIG. 6

```
async function createDataAndChart() {
  await Excel.run(async (context) => {
    let sheet = context.workbook.worksheets.add();
    sheet.name = "New sheet";
    sheet.getRange("A1").values = [["Animals"]];
    sheet.getRange("A2").values = [["Feet"]];
    sheet.getRange("A1:B1").format.font.bold = true;
    sheet.getRange("A2").values = [["Cat"]];
    sheet.getRange("B2").values = [[4]];
    sheet.getRange("A3").values = [["Fish"]];
    sheet.getRange("B3").values = [[0]];
    let body = sheet.getRange("A2:B3");
    body.format.font.italic = true;
    let chart = sheet.charts.add(Excel.ChartType.barClustered, body);
    chart.height = 300;
    chart.width = 400;
    await context.sync();
  });
}
```

FIG. 7

1502 CODE

SHEET1.GETRANGE("A1").VALUES = [["ANIMALS"]];
SHEET1.GETRANGE("B1").VALUES = [["FEET"]];
SHEET1.GETRANGE("A2").VALUES = [["KITTY"]];
SHEET1.GETRANGE("B2").VALUES = [[ 4 ]];
SHEET1.GETRANGE("A3").VALUES = [["OSTRICH"]];
SHEET1.GETRANGE("B3").VALUES = [[ 2 ]];
SHEET1.GETRANGE("A4").VALUES = [["FISH"]];
SHEET1.GETRANGE("B4").VALUES = [[ 0 ]];

SHEET1.GETRANGE("A1").FORMAT.FONT.BOLD = TRUE;
SHEET1.GETRANGE("B1").FORMAT.FONT.BOLD = TRUE;
SHEET1.GETRANGE("A2").FORMAT.FILL.COLOR = RED;
SHEET1.GETRANGE("B2").FORMAT.FONT.ITALIC = TRUE;
SHEET1.GETRANGE("A3").FORMAT.FILL.COLOR = "RED";
SHEET1.GETRANGE("B3").FORMAT.FONT.ITALIC = TRUE;
SHEET1.GETRANGE("A4").FORMAT.FILL.COLOR = "RED";
SHEET1.GETRANGE("B4").FORMAT.FONT.ITALIC = TRUE;

1504 CODE WITH COMBINED RANGES

SHEET1.GETRANGE("A1:B4").VALUES = [
["ANIMALS", "FEET"],
["KITTY", 4],
["OSTRICH", 2],
["FISH", 0]
];

SHEET1.GETRANGE("A1:B1").FORMAT.FONT.BOLD = TRUE;
SHEET1.GETRANGE("A2:A4").FORMAT.FILL.COLOR = "RED";
SHEET1.GETRANGE("B2:B4").FORMAT.FONT.ITALIC = TRUE;

FIG. 15

```
LINE   1700
 ↓
1702
1702.1    FUNCTION FINDRECTANGLES (EDITED_CELLS)
          // SORT AND CREATE INITIAL DATA PROCESSING STATE
1702.2        SORT EDITED_CELLS BY COLUMN VALUE (LEFT-TO-RIGHT)
1702.3        FOR EACH CELL IN EDITED_CELLS
1702.4            CELL.USED = FALSE
1702.5            CELL_MAP [CELL ADDRESS] = INDEX OF CELL IN EDITED CELLS
          // PROCESS EVERY EDITED CELL
1702.6        RECTANGLES = [ ]
1702.7        FOR EACH CELL IN EDITED_CELLS
1702.8            IF (CELL.USED == TRUE)
                      // WE'VE ALREADY PROCESSED AND INCLUDED THIS CELL IN A RECTANGLE
1702.9                CONTINUE;
1702.10           CELL.USED == TRUE
1702.11           RECT = 1X1 ON THE CELL
1702.12           RECTINCREASED =TRUE
1702.13           WHILE (RECTINCREASED == TRUE)
1702.14               RECTINCREASED = TRYCHANGERECTDIMENSION (RECT, EDIT_CELLS, CELL_MAP, "RIGHT")
                                   || TRYCHANGERECTDIMENSION (RECT, EDITED_CELLS, CELL_MAP, "DOWN")
                                   || TRYCHANGERECTDIMENSION (RECT, EDITED_CELLS, CELL_MAP, "UP")
                      // NO NEED TO STRETCH LEFT BECAUSE CELLS ARE SORTED BY COLUMN
                  // THE RECTANGLE HAS BEEN INCREASED IN EACH POSSIBLE DIRECTION AS FAR AS IT WILL GO
                  ADD RECT TO RECTANGLES
1702.15       RETURN RECTANGLES
```

FIG. 17

| LINE | |
|---|---|
| | // INCREASE THE RECTANGLE DIMENSION BY ONE IN THE STATED DIRECTION |
| | // THEN, IF IT'S CAPTURING MORE CELLS THAN BEFORE AND SATISFIES OTHER CONDITIONS, RETURN |
| 1802.1 | FUNCTION TRYCHANGERECTDIMENSION (RECT, EDITED_CELLS, CELL_MAP, DIRECTION): |
| 1802.2 | STRETCHEDRECT = STRETCH RECT BY ONE IN INDICATED DIRECITON |
| 1802.3 | DIFFRECT = STRETCHRECT – RECT    // THE NEWLY COVERED AREA |
| 1802.4 | NEWLYCOVEREDCOUNT = NUMBER OF EDITED CELLS IN DIFFRECT |
| 1802.5 | PROSPECTIVECOUNT = NUMBER OF EDITED CELLS IN STRETCHEDRECT |
| | // IF DIFFRECT DOES NOT COVER ENOUGH EDITED CELLS |
| | // OR STRETCHEDRECT DOES NOT CONTAIN ENOUGH EDITED CELLS |
| 1802.6 | IF (NEWLYCOVEREDCOUNT < 0.4 * CELLS IN DIFFRECT) RETURN FALSE; |
| 1802.7 | IF (PROSPECTIVECOUNT < 0.7 * CELLS IN STRETCHEDRECT) RETURN FALSE; |
| | // THE STRETCHING CAPTURED ENOUGH MORE EDITED CELLS, SO MARK THE NEWLY CAPTURED ONES |
| 1802.8 | FOR EACH CELL IN DIFFRECT |
| 1802.9 | CELL.USED = TRUE |
| 1802.10 | INCREASE SIZE OF RECT TO INCLUDE STRETCHEDRECT |
| 1802.11 | RETURN TRUE; |

FIG. 18 ns, in accordance with some embodiments;

COMBINING SPREADSHEET RECORDED OPERATIONS

TECHNICAL FIELD

Some embodiments relate to performing optimization or improvements to recorded operations. Some embodiments relate to combining recorded operations. Some embodiments relate to aliasing entities in recorded code. Some embodiments relate to generating macro code from user operations in a spreadsheet where user operations are combined using range of cells expressions.

BACKGROUND

Generating code (e.g., macro code) from user operations in an electronic document application (e.g., a spreadsheet) may be beneficial as a user may then not need to perform the user operations again, but rather may execute the generated code. Additionally, it may be important for the user to be able to quickly understand and edit the generated code.

BRIEF DESCRIPTION OF THE DRAWINGS

The present disclosure is illustrated by way of example and not limitation in the figures of the accompanying drawings, in which like references indicate similar elements and in which:

FIG. 6 illustrates macro code, in accordance with some embodiments;

FIG. 7 illustrates macro code, in accordance with some embodiments;

FIG. 15 illustrates the operation of a method of combining recorded operations, in accordance with some embodiments;

FIG. 17 illustrates a method of combining recorded operations, in accordance with some embodiments;

FIG. 18 illustrates a method of combining recorded operations, in accordance with some embodiments;

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims. Disclosed in some examples are methods, systems, devices, and machine-readable mediums for aliasing entities in recorded code. A user may use an electronic document application (e.g., a spreadsheet) and a recorder application (e.g., a macro recorder). The user enters input into the electronic document application that causes the electronic document application to perform operations, e.g. cells of a spreadsheet to be edited, values of cells of a spreadsheet to be added, etc. The electronic document application may record indications of the operations that were caused by the input of the user.

The electronic document application may send indications of the operations to the recorder application, which may record the indications of the operations. The recorder application may generate code (e.g., macro code) that when executed by the recorder application causes the operations to be performed within the electronic document application. The code generated by the recorder application may use an application program interface (API) of the electronic document application to cause the operations to be performed within the electronic document application. A user may be able to view and/or edit the code generated by the recorder application.

The operations may operate on objects or entities within the electronic document application. The recorder application may combine two or more operations based on whether the two or more operations are combinable. For example, the operations may reference cells in a spreadsheet and the recorder application may determine that the operations are combinable using a range of cells expression. The recorder application may determine not to combine operations even if they can be combined in order to improve the readability of the generated code for a user. A technical problem is how to reduce the number of operations that are performed by the generated code.

Combining operations may have the technical effect of reducing the number of operations that are performed by the generated code. Additionally, combining operations may make the generated code more readable as the combined code may be more concise.

Figure 1:
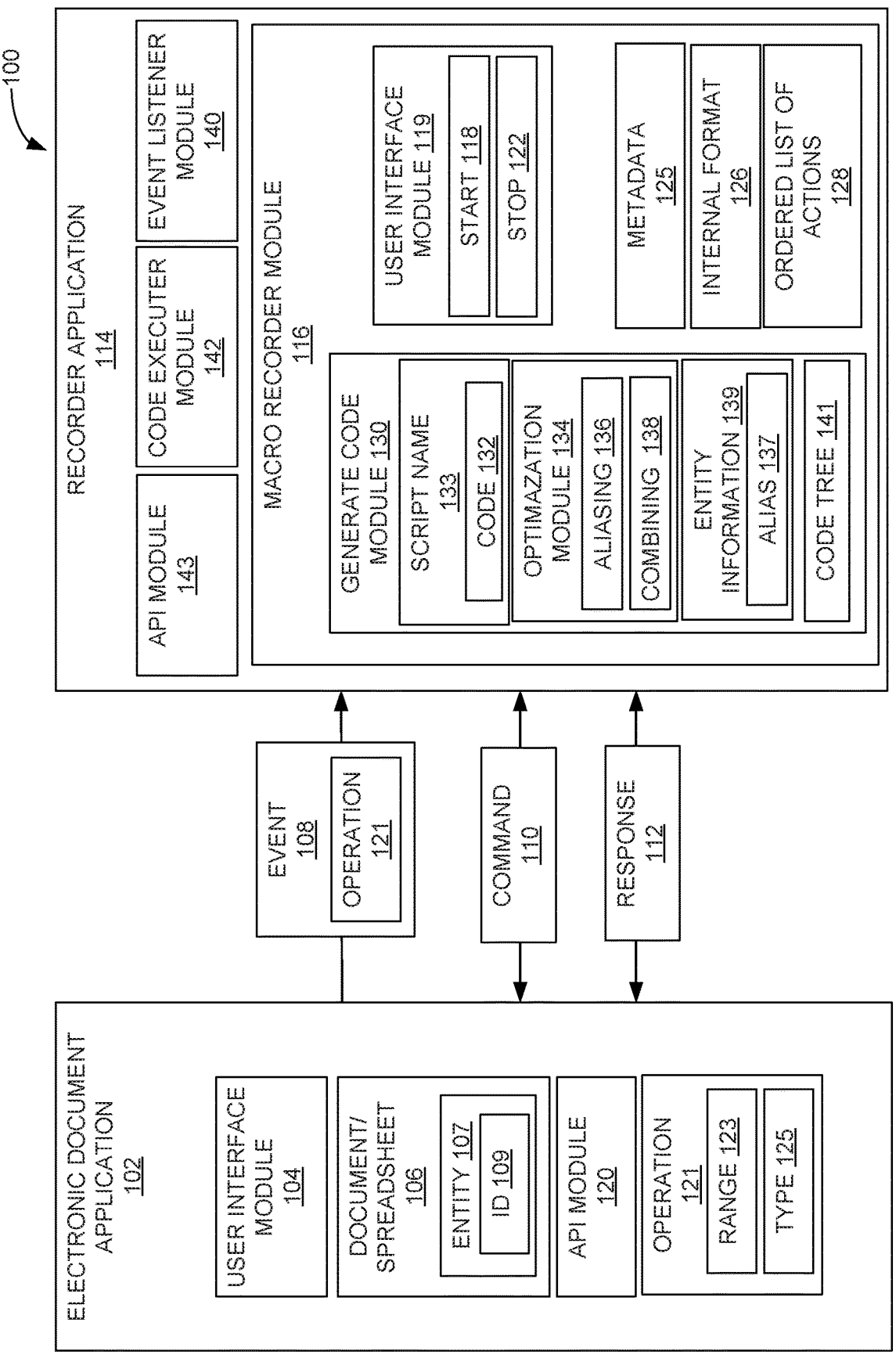
FIG. 1 illustrates a system for combining recorded operations and aliasing entities in recorded code, in accordance with some embodiments.

FIG. 1 illustrates a system for combining recorded operations and aliasing entities in recorded code 100, in accordance with some embodiments. Illustrated in FIG. 1 is electronic document application 102, event 108, command 110, response 112, and recorder application 114. The electronic document application 102 may be a spreadsheet, word processor, presentation program, etc. An example of the electronic document application 102 is EXCEL®. The electronic document application 102 includes a user interface module 104, document/spreadsheet 106, API module 120, and operation 121.

The user interface module 104 presents a user interface for a user (not illustrated) to enter input to the electronic document application 102. The input to the electronic document application 102 may cause an operation 121 to be performed by the electronic document application 102. The document/spreadsheet 106 is a document or spreadsheet that the electronic document application 102 is editing or creating. The document/spreadsheet 106 may be another type of object, e.g., a slide. Entity 107 may be a portion of the document/spreadsheet 106, e.g., a cell, a sheet, a table, a selection of cells, etc. An entity 107 may be an object separate from the document/spreadsheet 106, e.g., metadata. An entity 107 may have an identification (id) associated with the entity 107 that identifies the entity 107 and may be used to access the entity 107. Example entities 107 of a spreadsheet include charts, sheets, shapes, etc., in accordance with some embodiments. The electronic document application 102 may send a command 110 to the recorder application 114. For example, the user interface module 104 may present a menu item for the user that when selected sends a command 110 to the recorder application 114 with an indication that the recorder application 114 should start 118. The recorder application 114 may send a response 112 to the electronic document application 102 such as recording begun or initialization complete.

Operation 121 is an indication of an operation performed within the electronic document application 102, e.g., set a cell of a spreadsheet to a value, format a cell, create a new spreadsheet sheet, get a value of a cell of a spreadsheet, etc. The operation 121 may include a range 123 that indicates the range that the operations should be operated on, e.g., range 123 may indicate one or more cells of a spreadsheet. The operation 121 may include a type 125 that indicates the type of operation 121, e.g., bold, set color, cell value edits, and set background color, etc. Event 108 is broadcast to indicate an operation 121 has been performed within the electronic document application 102. Events 108 may include operation 121.

In some embodiments, events 108 includes information about the operation 121, e.g., an identification of a sheet of a spreadsheet, an address of a cell of a sheet, a value that was used to set a cell, a format that was used to set a cell of a sheet, an indication that a new sheet was created, etc. See, for example, order list of operations 128, operations 802, 902, 1002, etc.

The recorder application 114 includes macro recorder module 116, event listener module 140, code executer module 142, and API module 143. The recorder application 114 is a macro code recorder/player, in accordance with some embodiments. In some embodiments, the recorder application 114 uses an API module 143 to interact with the electronic document application 102 via events 108, commands 110, and responses 112, in accordance with some embodiments. In some embodiments, the recorder application 114 uses a Task Pane, which enables the user to use view and modify code 132 as well as issue commands to the recorder application 114. Event listener module 140 listens for or receives events 108. Code executer module 142 may include API module 143. The API module 143 may be a Microsoft Office Rich API. The API module 143 enables the code executer module 142 to execute operations 121 within the electronic document application 102 using the API module 120 of the electronic document application 102. The code executer module 142 executes the code 132 generated by generate code module 130. The code executer module 142 may send commands 110 to the electronic document application 102 such as operations 121 to be performed. The electronic document application 102 may send responses 112 to the commands 110 to the code executer module 142, e.g., a pointer to a spreadsheet.

Macro recorder module 116 includes UI module 119, metadata 125, internal format 126, ordered list of operations 128, and generate code module 130. The UI module 119 presents options for a user (or another program), e.g., start 118, stop 122, generate code, etc. In an example, where the electronic document application 102 is a spreadsheet, if a user selects start 118, then the UI module 120 may cause a command 110 to be sent to the electronic document application 102 where the command 110 includes an indication of a start command. In response to receiving the command 110 that includes an indication of a start command, the electronic document application 102 may perform the following: fetch names of all sheets, tables, etc.; fetch name of selected sheet; fetch address of selected range, etc. The response 112 to the command 110 may be stored in metadata 125. The metadata 125 may be information regarding a state of the electronic document application 102 before the recording of an operation 121 begins. Internal format 308 (FIG. 3) is an example of metadata 125 that is retrieved from a spreadsheet.

In some embodiments, the macro recorder module 116 receives an event 108 from the event listener module 140 and transforms an operation 121 included in the event 108 into an internal format 126. The internal format 126 is described herein (e.g., FIGS. 2-9) and facilitates the generation of code 132. The macro recorder module 116 maintains an ordered list of operations 128 from the events 108. The ordered list of operations 128 is an ordered list of operations 121 in an internal format, in accordance with some embodiments.

Generate code module 130 takes the ordered list of operations 128 and generates code 132. The code 132 is a readable format that may be displayed by the UI module 120 to a user. The code 132 may have a script name 133 associated with the code 132. The code 132 may be in JavaScript®, VisualBasic®, or another programming language that utilizes the API module 143 to perform operations 121 and access entities 107 within the electronic document application 102. The code 132 replays the ordered list of operations 128. The code 132 may be generated based on the metadata 125 as disclosed herein. Because the context may be different (e.g., the code may be executed in a different spreadsheet), the code 132 may replay the ordered list of operations 128, but the result within the electronic document application 102 may not be exactly the same as when the input of the user caused the operations 121 to be performed by the electronic document application 102.

In some embodiments, generate code module 130 is configured to add extra code 132 preceding an operation 121 that references an entity 107 with an alias 137. For example, as disclosed in conjunction with FIG. 9 code 912 is added to set alias 137 "sheet" to entity 107 "SheetID: <ID1>". In some embodiments, generate code module 130 generates code 132 to set an alias 137 for operations 121 that create an entity 107. For example, referring to FIG. 10, code 1016 sets alias 137 "table" to a value of the table created by "creatable" of operation 1008.

Optimization module 134 may perform one or more optimizations of the code 132. For example, optimization module 134 may include aliasing 136 and combining 138.

The optimization module 134 may be performed during the generation of the code 132 by generate code module 130. Generate code module 130 may generate a code tree 141 as an intermediary step in generating the code 132. In some embodiments, generate code module 130 generates a code tree 141 with each node comprising a code snippet with placeholders (e.g., "EntityKeyWrapper[id]".) Entity 107 information may be stored in entity information 139, which may include names and ids of entities 107. Entity information 139 may be used as part of generating the code 132. Entity information 139 may include alias 137 for an entity 107. The alias 137 may be a name to use in the code 132 to refer to entity 107 in the electronic document application 102. In some embodiments, generate code module 130 processes the code tree 141 in an inorder traversal where for each node the following is performed. For each placeholder, if an alias has not yet been generated, create one. Use the entity information 139 for the details if an alias has been created. Replace placeholders with the alias for that placeholder's id. Then all the resulting strings are concatenated together to create the code 132. In some embodiments, an operation may be termed an action.

Figure 2:
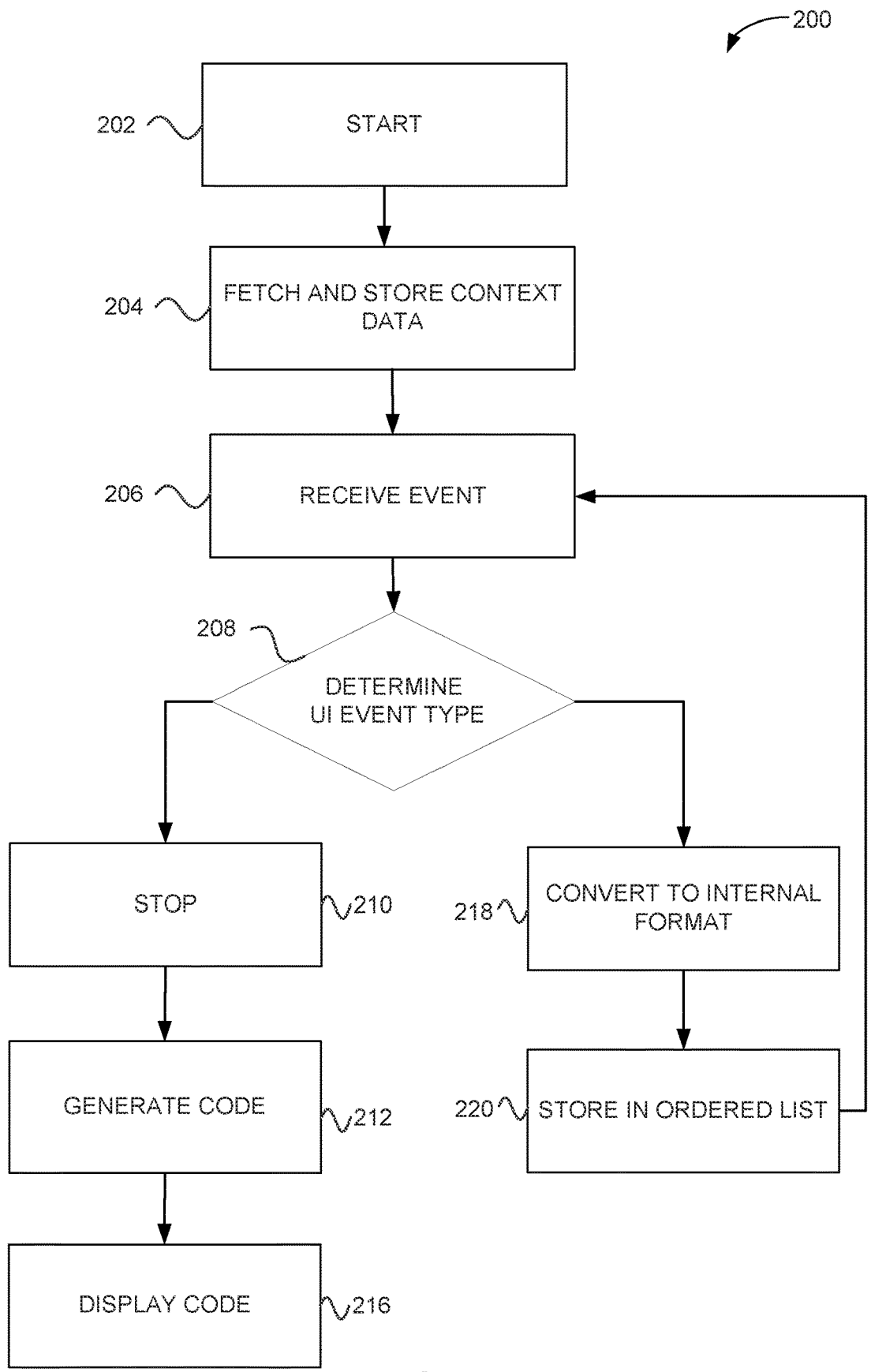
FIG. 2 illustrates a method for aliasing entities in macro recorded code, in accordance with some embodiments.
Figure 3:
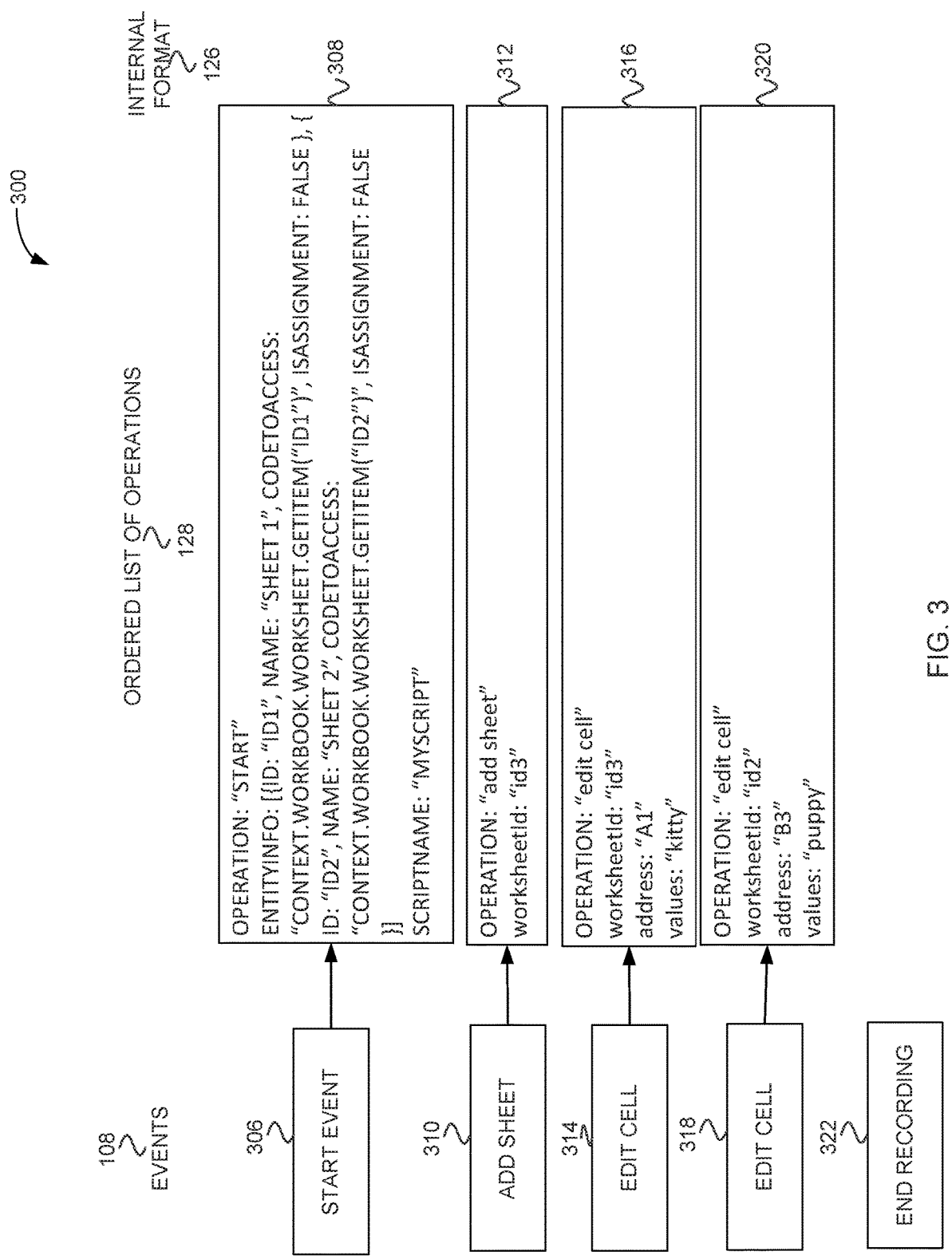
FIG. 3 illustrates the operation of a method for aliasing entities in macro recorded code, in accordance with some embodiments.

FIG. 2 illustrates a method 200 for aliasing entities in macro recorded code, in accordance with some embodiments. FIG. 2 will be disclosed in conjunction with FIGS. 3-5. The method 200 begins at operation 202 with starting. For example, start 118 may be selected on the UI module 120 (or user interface module 104). The recorder application 114 may retrieve metadata 125 from the electronic document application 102 as described in conjunction with FIG. 1. FIG. 3 illustrates the operation of a method 300 for aliasing entities in macro recorded code, in accordance with some embodiments. Illustrated in FIG. 3 is events 108, ordered list of operations 128, and internal format 126. The events 108 may be the same or similar as events 108 of FIG. 1. The ordered list of operations 128 may be the same or similar as ordered list of operations 128 of FIG. 1. The internal format 126 may be the same as similar as internal format 126 of FIG. 1. In another example of operation 202, start event 306 may be received by the recorder application 114, e.g., by event listener module 140.

The method 200 continues at operation 204 with fetching and storing context data. For example, the recorder application 114 may retrieve internal format 308 from the electronic document application 102 and store it as metadata 125. The internal format 308 or metadata 125 may include one or more of the following: an indication of the operation 121, "OPERATION: 'START'"; information regarding an entity 107 with ID 109 being "id1" with the following specific information: name: 'Sheet 1', code to access: "context.workbook.worksheet.getItem('id1')", and isAssignment equal to "false"; information regarding another entity 107 with ID 109 being "id2" with the following specific information: name: "Sheet 2", codeToAccess: "context.workbook.worksheet.getItem("id2")", isAssignment: false; and, with an indication that a script name 133 is "MyScript". Internal format 308 or metadata 125 indicates that there are two sheets already created "SHEET 1" ("ID1") and "SHEET 2" ("ID2").

The method 200 may continue at operation 206 with receiving event. For example, referring to FIG. 3, add sheet 310 may be received. The method 200 may continue at operation 208 with determining UI event type. For example, recorder application 114 may determine that add sheet 310 is not an event 108 of type stop. The method 200 may continue at operation 218 with convert to internal format. For example, the macro recorder 116 may convert add sheet 310 to: "Operation: 'add sheet' and worksheetid: 'id3'". The operation 121 is "add sheet' and the ID 109 of the entity 107 worksheet that is created is "id3". The method 200 continues at operation 220 with storing in ordered list. For example, internal format 312 may be added to ordered list of operations 128.

The method 200 returns to operation 206 with receiving event. For example, referring to FIG. 3, edit cell 314 may be received. The method 200 may continue at operation 208 with determine UI event type. For example, recorder application 114 may determine that edit cell 314 is not an event 108 of type stop. The method 200 may continue at operation 218 with convert to internal format. For example, the macro recorder 116 may convert edit cell 314 to: "Operation: 'edit cell'; worksheetId: 'id3'; address: 'A1'; and values: 'kitty'". These indicate that the operation 121 is "edit cell' and that an ID 109 of the entity 107 worksheet that is edited is "id3". The method 200 continues at operation 220 with storing in ordered list. For example, internal format 316 may be added to ordered list of operations 128.

The method 200 returns to operation 206 with receiving event. For example, referring to FIG. 3, edit cell 318 may be received. The method 200 may continue at operation 208 with determine UI event type. For example, recorder application 114 may determine that edit cell 318 is not an event 108 of type stop. The method 200 may continue at operation 218 with convert to internal format. For example, the macro recorder 116 may convert edit cell 318 to: "Operation: 'edit cell'; worksheetId: 'id2'; address: 'B3'; and values: 'puppy'". These indicate that the operation 121 is "edit cell' and that an ID 109 of the entity 107 worksheet that is edited is "id2". The method 200 continues at operation 220 with storing in ordered list. For example, internal format 318 may be added to ordered list of operations 128.

The method 200 returns to operation 206 with receiving event. For example, referring to FIG. 3, end recording 322 may be received. The method 200 may continue at operation 208 with determine UI event type. For example, recorder application 114 may determine that end recording 322 is an event 108 of type stop. A user may have selected stop 122 in the UI module 120 (or user interface module 104).

The method 200 may continue at operation 210 with stopping. For example, the macro recorder 116 may stop recording. The method 200 may continue at operation 212 with generating code. For example, FIGS. 4 and 5 illustrate an embodiment of generating code from the ordered list of operations 128.

Figure 4:
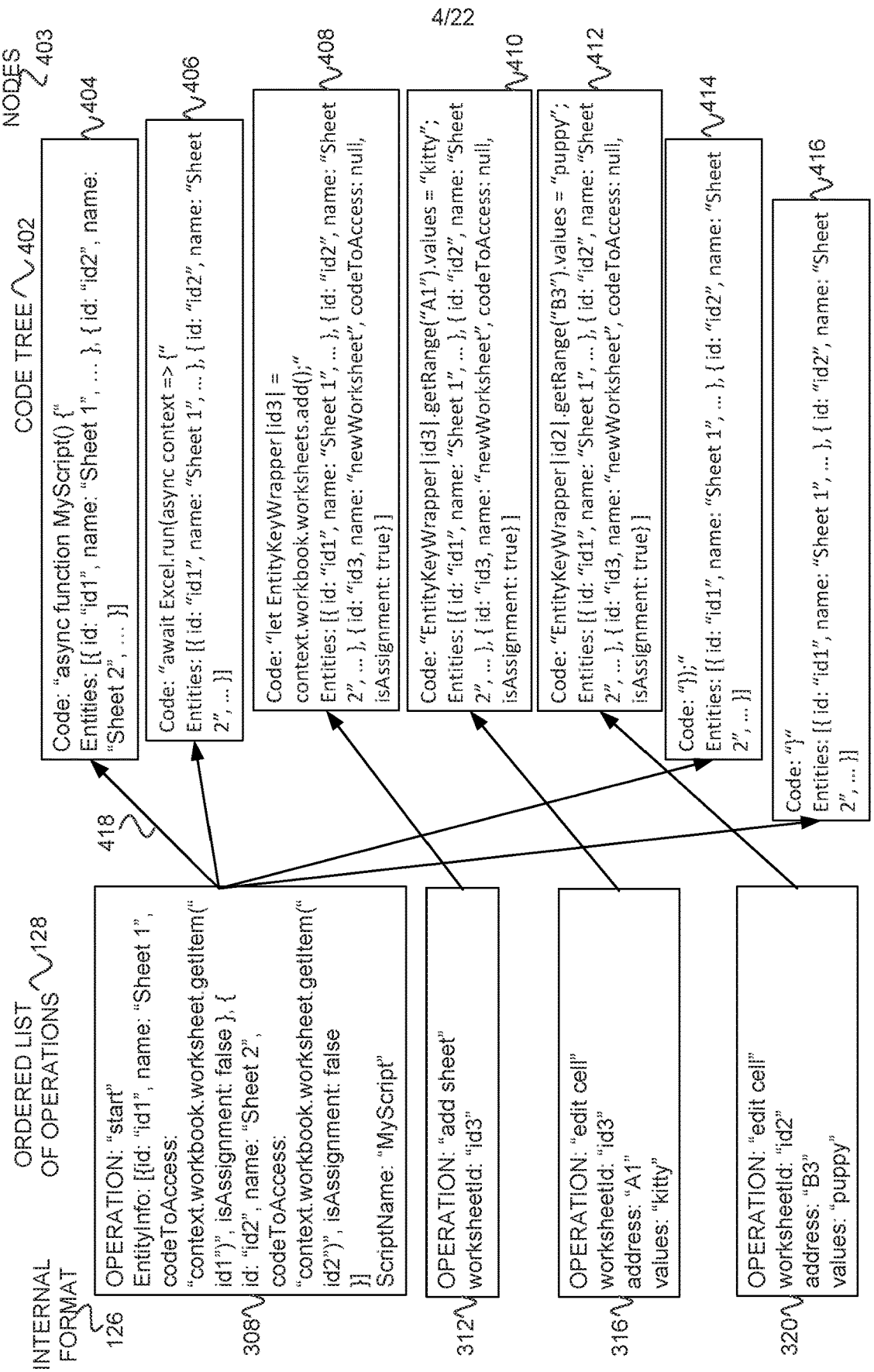
FIG. 4 illustrates generation of a code tree, in accordance with some embodiments.
Figure 5:
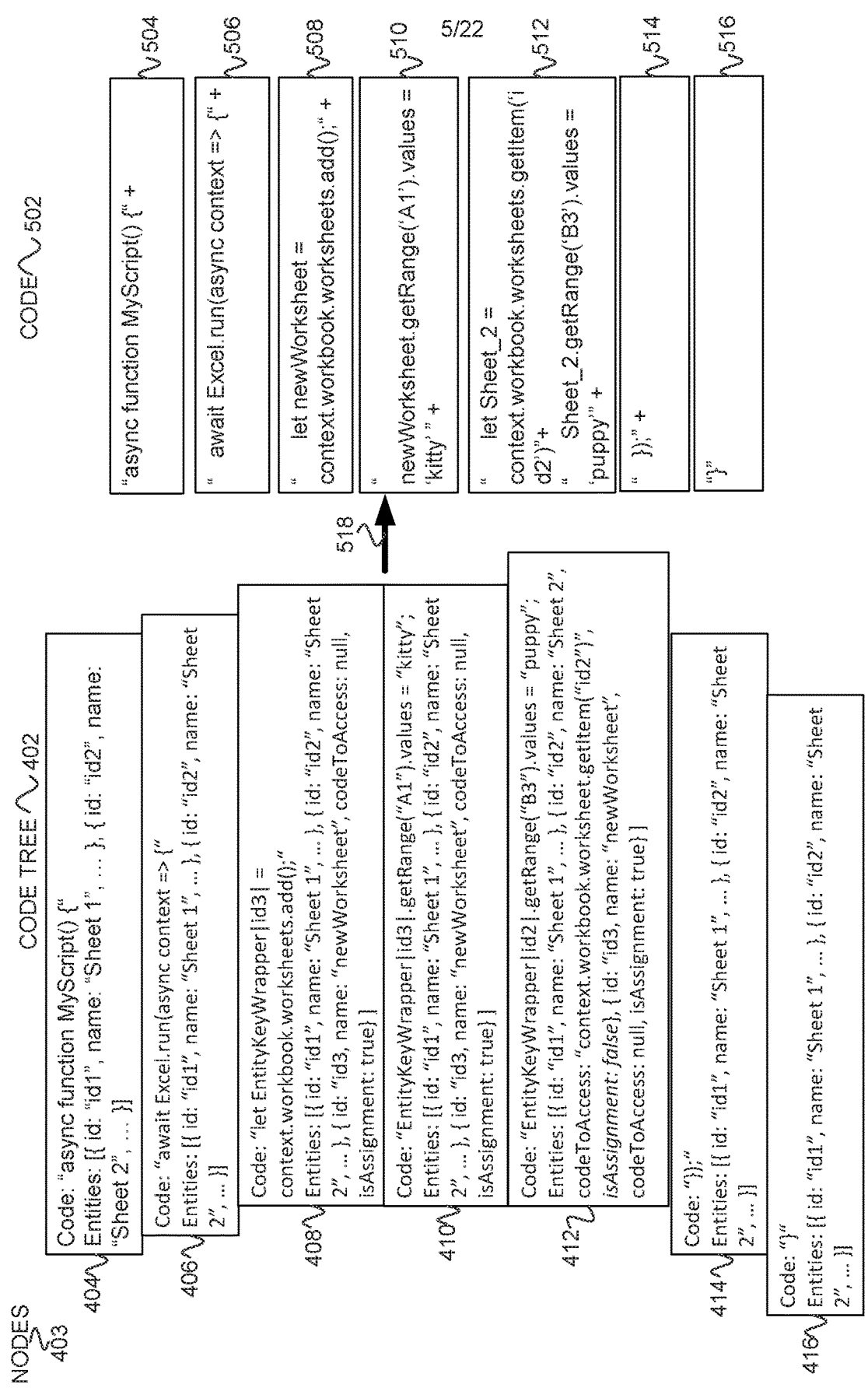
FIG. 5 illustrates code tree, nodes code, and in order traversal, in accordance with some embodiments.

FIG. 4 illustrates generation of a code tree 402, in accordance with some embodiments. Illustrated in FIG. 4 is ordered list of operations 128, internal format 126, and code tree 402 comprising nodes 403. The nodes 403 are 404, 406, 408, 410, 412, 414, and 416. Generate code module 130 generates the code tree 141 (e.g., code tree 402) from the ordered list of operations 128 (e.g., internal format 126). The arrows 418 indicate the nodes 403 that are generated from the internal format 126. For example, generate code module 130 generates nodes 404, 406, 414, and 416 from internal format 308. Node 404 names the code and entities. Node 406 waits for the electronic document application 102 (e.g., Excel®) and defines the entities. Node 414 closes the code and defines the entities. Node 416 completes the code close and defines the entities. The code may be determined based on JavaScript® or another programming language. The code is determined based on the API module 143 to access the electronic document application 102. For example, "context.workbook.worksheets.add( )" of node 408 is a call to an API module 143 routine to add a sheet to a spreadsheet. The API module 120 of the electronic document application 102 may provide entry routines for the recorder application 114 to call using the API module 143.

Generate code module 130 generates node 408 from internal format 312, where node 408 includes code to perform the operation of adding a sheet of a spreadsheet. Generate code module 130 determines that internal format 312 is adding a sheet ("Operation: 'add sheet'") that was not created at the start of the script, i.e., it is not part of internal format 308. Generate code module 130 determines the code should be "let EntityKeyWrapper[id3]=context.workbook.worksheets.add( )," where "EntityKeyWrapper[id3]" is place holder for the sheet or alias.

Generate code module 130 generates node 410 from internal format 316 where a reference to the sheet created in node 408 is used, i.e., "newWorksheet." Node 410 includes code to perform the edit cell in accordance with internal format 316. Node 412 includes code to perform edit cell in accordance with internal format 320. Generate code module 130 generates node 412 based on the sheet being referenced ("worksheetid: 'id2'") already existing when the start 118 was selected.

After the code tree 402 is generated, generate code module 130 generates code 502. FIG. 5 illustrates code tree 402, nodes 403, code 502, and inorder traversal 518, in accordance with some embodiments. Inorder traversal 518 indicates that generate code module 130 traverses the code tree 402 inorder to generate the code 502. An inorder traversal 518 is to traverse a code tree 402 by first visiting nodes 403 in the following order: a left child node, a node, and a right child node, where the procedure is performed recursively. The order of the nodes 403 of the code tree 402 as illustrated in FIG. 5 is of an inorder traversal.

Generate code module 130 generates code 504 from node 404, code 506 from 406, code 508 from 408, code 510 from 410, code 512 from node 412, code 514 from node 514, and code 516 from node 416. The alias (e.g., alias 137) "newWorksheet" is created by code 508. The id "id3" may be used within the electronic document application 102 to reference "newWorksheet." "Id3" is used to determine the name to use from node 410, e.g., "newWorksheet." Code 510 uses the alias "newWorksheet" to edit cell A1 to the value of "kitty." Code 512 uses the alias "Sheet_2" to edit cell B3 to the value of "puppy."

Because isAssignment is true in node 403, which indicates a sheet create, generate code module 130 does not explicitly generate a line of code to create the alias "newWorksheet." The alias "newWorksheet" is assigned as a byproduct of the operation the user is taking, i.e., code 508.

In node 412 a sheet with id "id2" is being accessed without first an assignment, i.e., "isAssignment: false." This means the sheet with id "id2" already exists. Generate code module 130 first generates a line of code that sets "Sheet_2" to the value of codeToAccess (from node 412), "context.workbook.worksheet. getitem("id2"). And then generate code module 130, generates a line of code to edit cell B3 of "Sheet_2" to the value "puppy". The code 502 may then be executed to recreate the events 108.

The method 200 may continue with displaying code 216. For example, recorder application 114 or macro recorder 116 may display the code 502 generated as part of a UI module 120. The code executer module 142 may execute the code 502, which may produce the same results as events 108. In some embodiments, the code 502 may be saved and used on another spreadsheet of the electronic document application 102.

The method 200 may include one or more additional operations. One or more of the operations of method 200 may be optional. The operations of method 200 may be performed in a different order, in accordance with some embodiments.

FIG. 6 illustrates macro code 602, in accordance with some embodiments. The macro code 602 may be in Visual Basic®. The macro code 602 does not include aliases. For example, "ActiveCell.FormulaR1C1='1'" implicitly is referring to an active sheet, which is "Sheet2". The macro code 602 may not run properly if it were executed by code executor 142. For example, if macro code 602 were run a second time, then the next "Sheets.Add After:=ActiveSheet" would be set to "Sheet3". But the next line of macro code would be "Sheets('Sheet2').Select", so "Sheet2" would be selected. The rest of the operations would be performed on "Sheet2" rather than "Sheet3." Or if "Sheet2" has been renamed or deleted (or the macro code 602 run in a new spreadsheet), then the macro code 602 would most like not operate properly because "Sheets('Sheet2').Select" would fail.

In some embodiments, the macro code is generated so that when an entity 107 is referenced, then an alias 137 is used to refer to the entity 107. User interface module 104 constructs or operations 121 such as select or activate (e.g., operations 121 that set a default or implicit entity 107 such as a sheet) are not used in the macro code, in accordance with some embodiments.

FIG. 7 illustrates macro code 702, in accordance with some embodiments. The macro code 702 may be in Visual Basic®. The macro code 702 may be easier for a user to read than the macro code 602 due to the additions of aliases. The alias "sheet" is set to "context.workbook.worksheets. add( )". This enables the following operations to use the alias "sheet." Additionally, the alias "body" is set to "sheet.getRange("A2:B3")". This enables the subsequent operation to use the alias "body." Additionally, "chart" is set to "sheet.chart.add (Excel.ChartType.barClustered, body)". This enables subsequent operations to use the alias "chart." The use of aliases may make the macro code 702 more portable as easier to understand.

Figure 8:
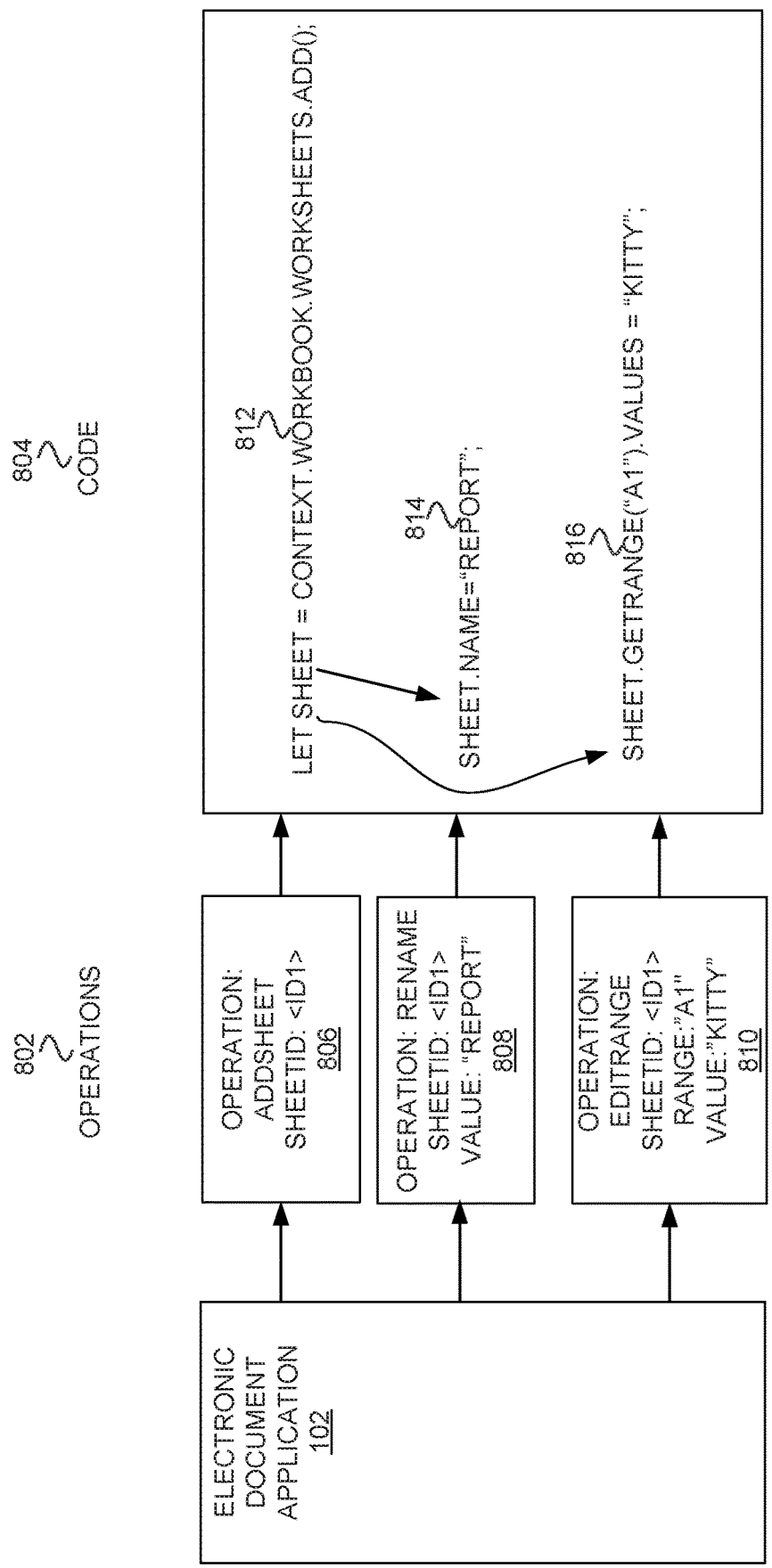
FIG. 8 illustrates the operation of a method for aliasing entities in macro recorded code where an extra code line is not generated, in accordance with some embodiments.

FIG. 8 illustrates the operation of a method for aliasing entities in macro recorded code where an extra code line is not generated, in accordance with some embodiments. Illustrated in FIG. 8 is electronic document application 102, operations 802, and code 804. Electronic document application 102 may be the same or similar as electronic document application 102. Operations 802 may be the same or similar as operations 121. Code 804 may be the same or similar as code 132. The operations 802 may be generated based on (referring to FIG. 1) a user generating events 108 from the use of the user interface module 104. In some embodiments the operations 802 have been partially or wholly processed into an internal format 126. The code 804 is code (e.g., Visual Basic®) generated by generate code module 130.

Generate code module 130 generates an alias "sheet" in code 812 for "addsheet" in operation 806. The alias "sheet" enables the other code 814, 816 to use the alias "sheet" rather than using a default or implicit sheet of the electronic document application 102. Generate code module 130 can create the alias "sheet" without an extra line because the operation 806 is creating the sheet within the electronic document application 102. Generate code module 130 generates code 814 from operation 808 where rather than using an implicit sheet of electronic document application 102, the alias "sheet" is used explicitly. Generate code module 130 generates code 816 from operation 810 where the alias "sheet" is used rather than using an implicit sheet of electronic document application 102.

Figure 9:
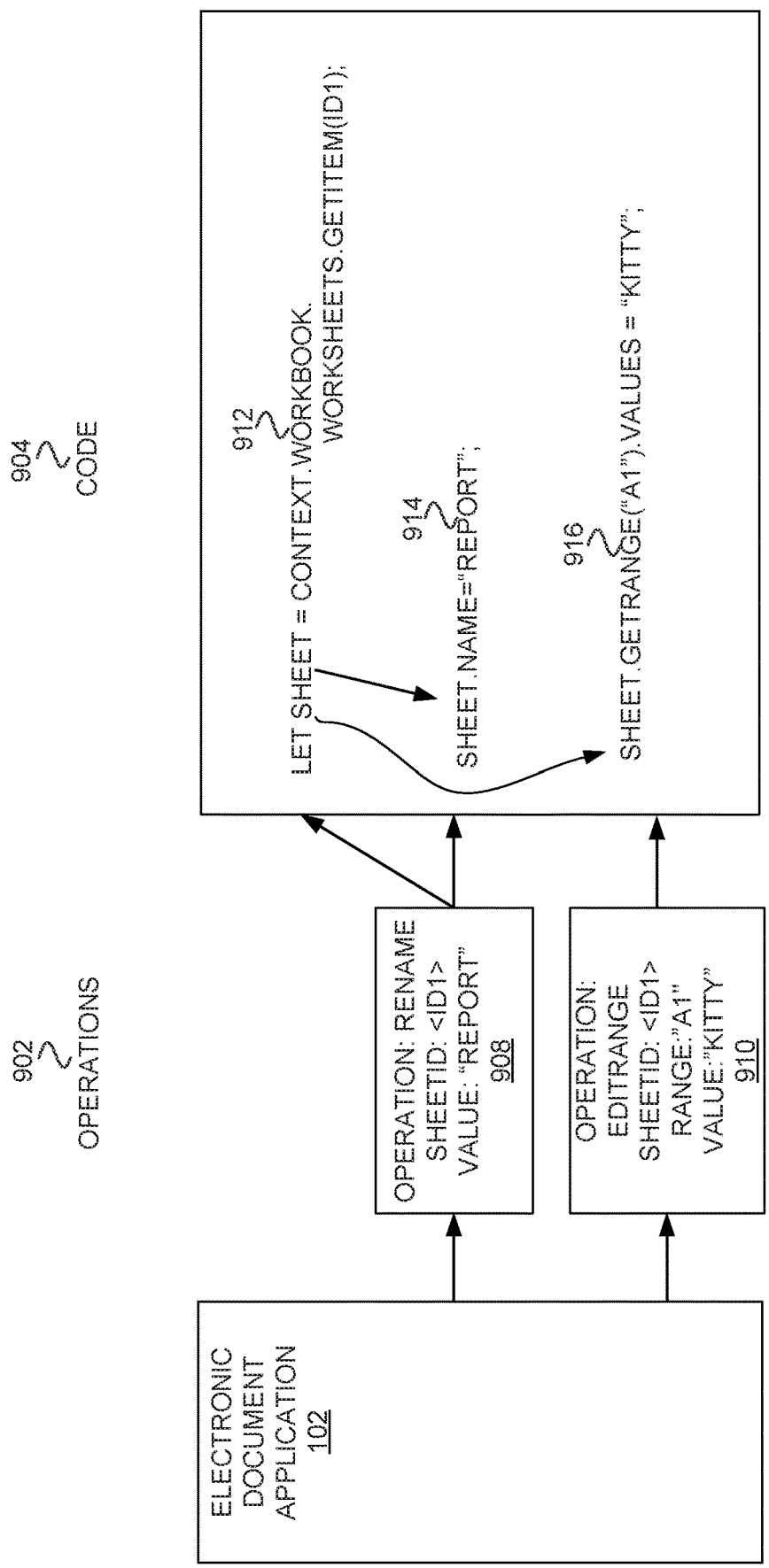
FIG. 9 illustrates the operation of a method for aliasing entities in macro recorded code where an extra code line is generated, in accordance with some embodiments.

FIG. 9 illustrates the operation of a method for aliasing entities in macro recorded code where an extra code line is generated, in accordance with some embodiments. Illustrated in FIG. 9 is electronic document application 102, operations 902, and code 904. Electronic document application 102 may be the same or similar as electronic document application 102. Operations 902 may be the same or similar as operations 121. Code 904 may be the same or similar as code 132. The operations 902 may be generated based on (referring to FIG. 1) a user generating events 108 from the use of the user interface module 104. In some embodiments the operations 902 have been partially or wholly processed into an internal format 126. The code 904 is code (e.g., Visual Basic®) generated by generate code module 130. In response to operation 908, generate code module 130 generates an alias 137 "sheet" in code 912 that "add[s]" a sheet. The alias 137 "sheet" enables the other code 914, 916 to use the alias 137 "sheet" rather than using a default or implicit sheet of the electronic document application 102. Generate code module 130 needs an extra line of code 912 because the operation 908 is using a sheet "<ID1>" that is already created. Generate code module 130 generates code 914 from operation 908 where rather than using sheet ("sheeted: <id1>") of electronic document application 102, the alias 137 "sheet" is used. Generate code module 130 generates code 916 from operation 910 where the alias 137 "sheet" is used rather than using an implicit sheet of electronic document application 102. The code 904 may be more portable as it creates a "sheet" that is not dependent on a sheet ("sheetID:<ID1>") already existing within the electronic document application 102. The code 904 may be more readable as the code 912, 914, and 916, explicitly reference the alias 137 "sheet" so that it is clear which sheet is being referenced.

Figure 10:
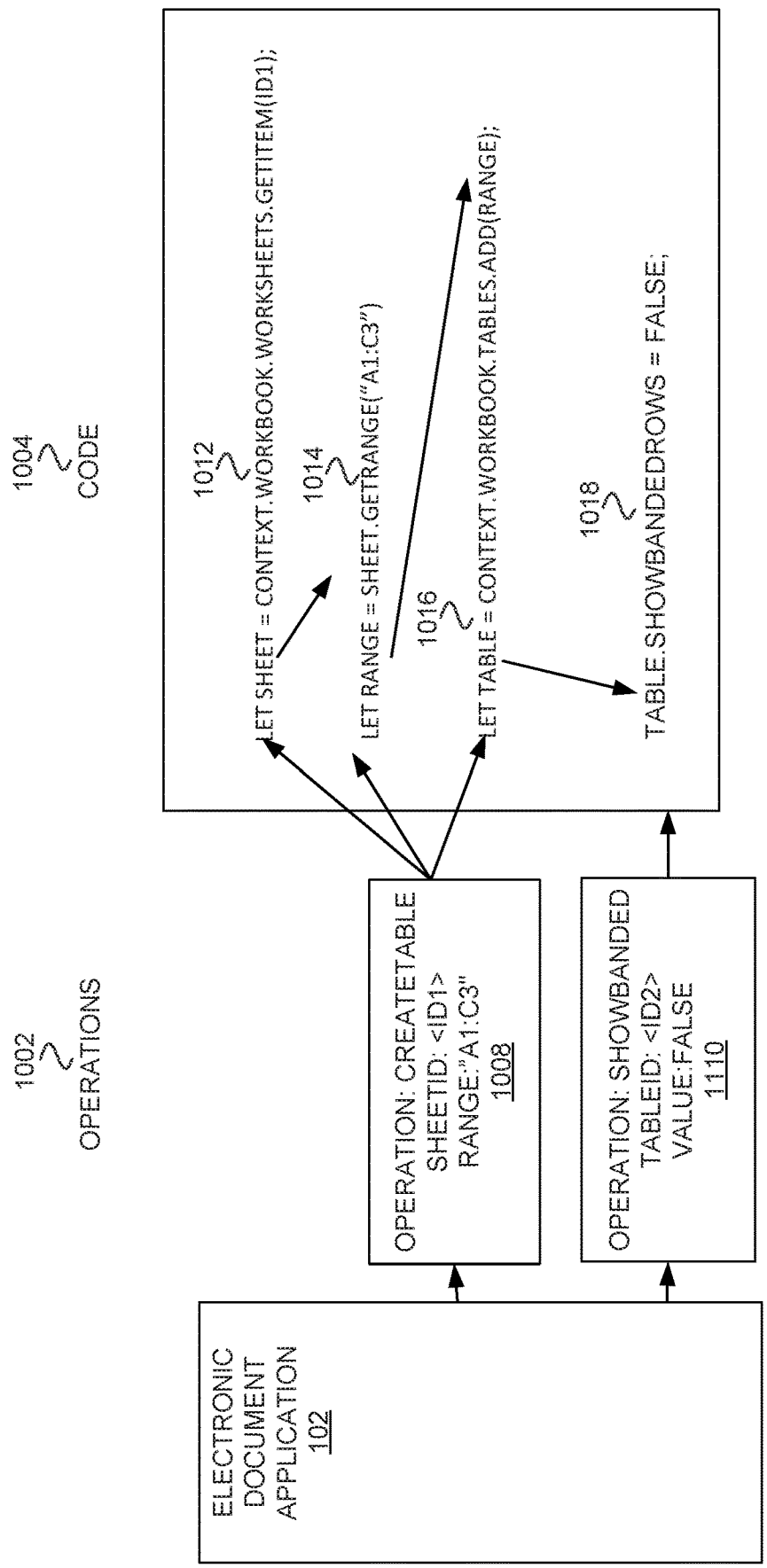
FIG. 10 illustrates the operation of a method for aliasing entities in macro recorded code where extra code lines are generated, in accordance with some embodiments.

FIG. 10 illustrates the operation of a method for aliasing entities in macro recorded code where extra code lines are generated, in accordance with some embodiments. Illustrated in FIG. 10 is electronic document application 102, operations 1002, and code 1004. Electronic document application 102 may be the same or similar as electronic document application 102. Operations 1002 may be the same or similar as operations 121. Code 1004 may be the same or similar as code 132. The operations 902 may be generated based on (referring to FIG. 1) a user generating events 108 from the use of the user interface module 104. In some embodiments the operations 1002 have been partially or wholly processed into an internal format 126. The code 1004 is code (e.g., Visual Basic®) generated by generate code module 130. In response to operation 1008, generate code module 130 generates code 1012, 1014, and 1016. Generate code module 130 generates an alias 137 "sheet" in code 1012 that provides an alias 137 "sheet" for "sheeted: <ID1>" of electronic document application 102. Generate code module 130 generates code 1014 with an alias 137 "range" for "range:'A1:C3'" of operation 1008. The alias 137 "range" enables "range" to be used in the code 1016. Generate code module 130 generates code 1016 with an alias 137 "table" that enables the alias 137 "table" to be used in code 1018.

Generate code module 130 generates code 1018 to use the alias 137 "table." The code 1004 may be more readable as the code 1012, 1014, 1016, and 1018, explicitly reference the aliases "sheet", "range", and "table" so that there are not implicit references to entities 107 within electronic document application 102.

Figure 11:
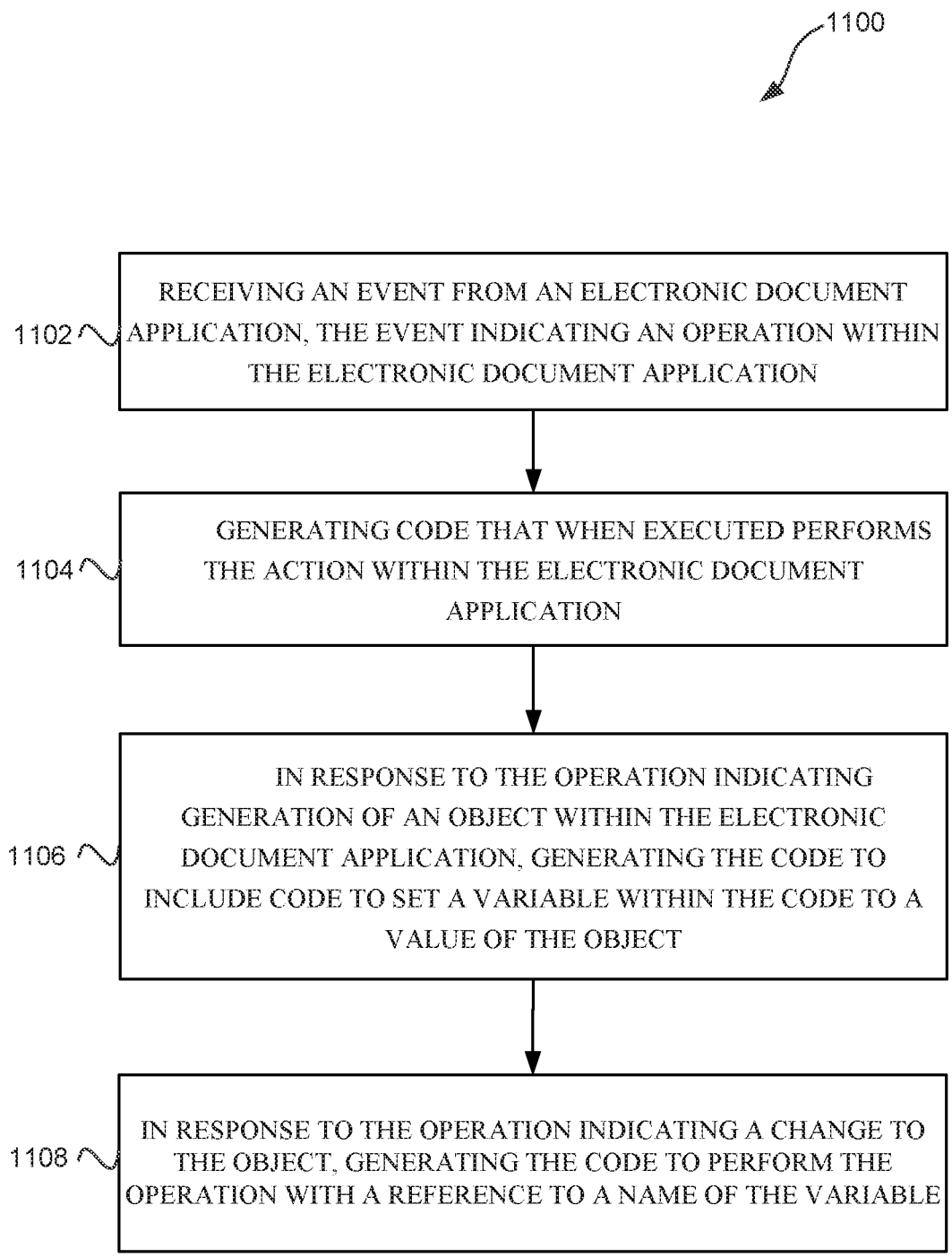
FIG. 11 illustrates a method for aliasing entities in recorded code in accordance with some embodiments.

FIG. 11 illustrates a method 1100 for aliasing entities in recorded code, in accordance with some embodiments. Method 1100 begins at operation 1102 with receiving an event from an electronic document application, the event indicating an operation within the electronic document application. For example, referring to FIG. 1, recorder application 114 may receive event 108 from electronic document application where the event 108 indicates an operation 121. In another example, referring to FIG. 3, recorder application 114 may receive events 108 with indications of operations within electronic document application 102, e.g., add sheet 310. In another example, referring to FIGS. 8, 9, and 10, application 102 may receive operations 802, 902, 1002, from electronic document application 102. In another example, referring to FIG. 2, method 200 may be performed by recorder application 114 where at operation 206 an event that includes an operation is received from electronic document application 102.

The method 1100 continues at operation 1104 with generating code that when executed performs the operation within the electronic document application. For example, referring to FIG. 1, generate code module 130, generates code 132 that when executed (e.g., code executer module 142) performs the operation 121 indicated in the event 108. In another example, operation 212 as disclosed in conjunction with FIG. 2, generates code 132 that when executed (e.g., code executer module 142) performs operation 121 within the electronic document application 102. In another example, referring to FIG. 5, generate code module 130 generates code 502 from code tree 402. The code 502 performs operations (e.g., "edit cell" 314) within electronic document application 102. In another example, code 702 is an example of code that may be generated by generate code module 130 that include code that execute operations 121 within the electronic document application 102, e.g., "sheet.getRange("B2").values=[[4]]". In other examples, code 804, 904, 1004, illustrate code (e.g., 816, 916, 1018) that when executed performs operations within the electronic document application 102.

The method 1100 continues at operation 1106 with in response to the operation indicating generation of an object within the electronic document application, generating the code to include code to set a variable within the code to a value of the object. For example, in response to operation "add sheet" 310 (FIG. 3) generate code 310 generates code 508 "let newWorksheet=context.workbook.worksheets.add." In another example, referring to FIG. 8, generate code module 130 from operation 806 "operation:addsheet sheeted: <id1>" generates code 812 "let sheet=context.workbook.worksheets.add( )." Similarly, generate code module 130 generates code 1016 from operation 1008.

The method 1100 continues at operation 1108 with in response to the operation indicating a change to the object, generating the code to perform the operation with a reference to a name of the variable. For example, generate code module 130 (FIG. 1) generates code 510 (FIG. 5) that references "newWorksheet". In another example, generate code module 130 generates code 814 and 816 (FIG. 8) to reference "sheet." In another example, generate code module 130 generates code 914 and 915 (FIG. 9) to reference "sheet". In another example, generates code module 130 generates code 1014 to reference "sheet," and generates code 1016 and 1018 to reference "table."

Method 1100 may be performed on a computing device that includes a processor and memory comprising instructions which when performed by the processor, cause the processor to perform operations of method 1100. Method 1100 may include one or more additional operations. One or more of the operations of method 1100 may be optional. Method 1100 may be performed in a different order.

Figure 12:
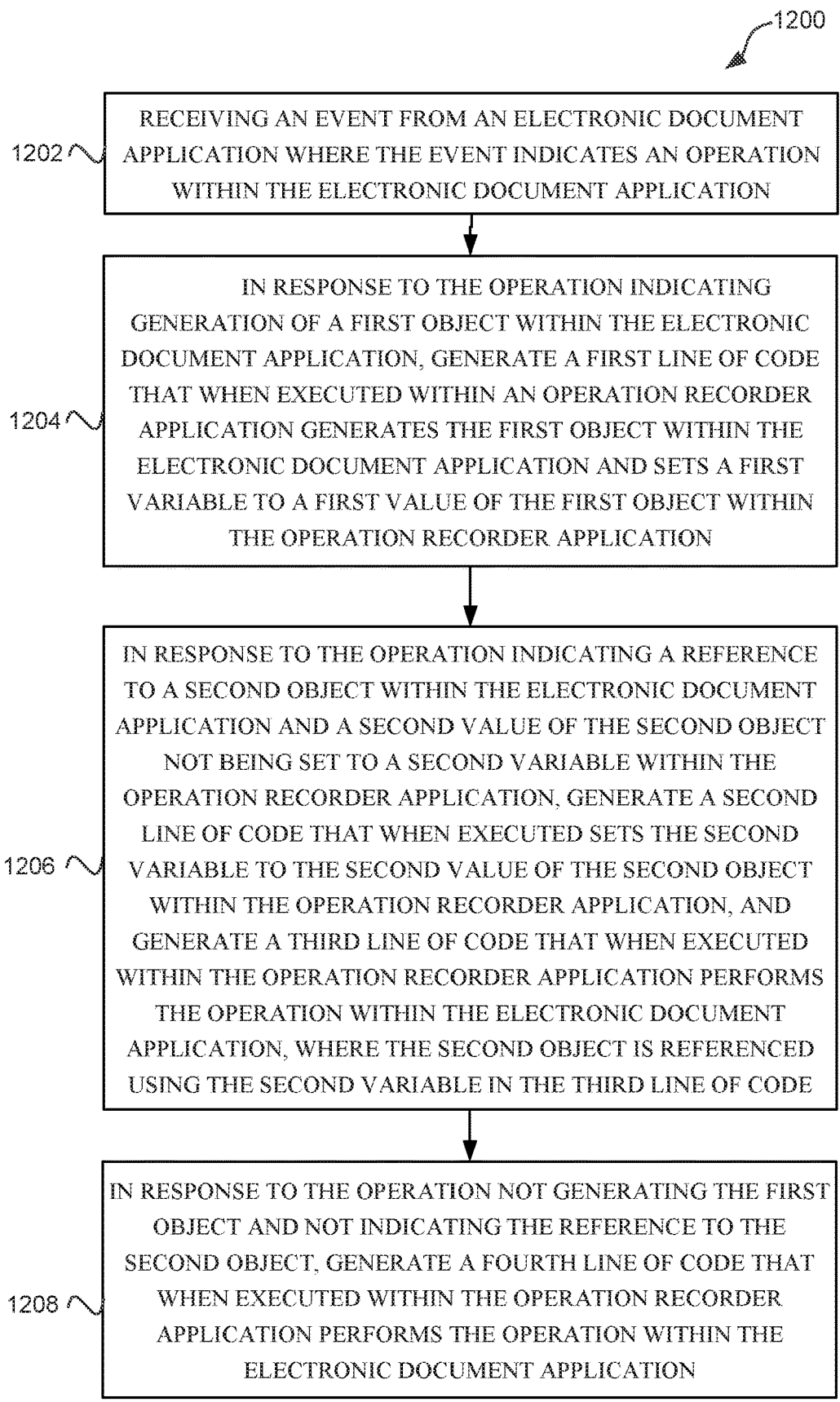
FIG. 12 illustrates a method for aliasing entities in recorded code in accordance with some embodiments.

FIG. 12 illustrates a method 1200 for aliasing entities in recorded code, in accordance with some embodiments. Method 1200 begins at operation 1202 with receiving an event from an electronic document application, the event indicating an operation within the electronic document application. For example, referring to FIG. 1, recorder application 114 may receive event 108 from electronic document application where the event 108 indicates an operation 121. In another example, referring to FIG. 3, recorder application 114 may receive events 108 with indications of operations within electronic document application 102, e.g., add sheet 310. In another example, referring to FIGS. 8, 9, and 10, application 102 may receive operations 802, 902, 1002, from electronic document application 102. In another example, referring to FIG. 2, method 200 may be performed by recorder application 114 where at operation 206 an event that includes an operation is received from electronic document application 102.

Method 1200 begins at operation 1204 with in response to the operation indicating generation of a first object within the electronic document application, generating a first line of code that when executed within an operation recorder application generates the first object within the electronic document application and sets a first variable to a first value of the first object within the operation recorder application. For example, in response to operation "add sheet" 310 (FIG. 3) generate code 310 generates code 508 (FIG. 5) "let newWorksheet=generate code module 130 in response to operation 806 "operation:addsheet sheeted: <id1>" generates code 812 "let sheet=context.workbook.worksheets. add( )." Similarly, generate code module 130 generates code 1016 from operation 1008.

The method 1200 may continue at operation 1206 with in response to the operation indicating a reference to a second object within the electronic document application and a second value of the second object not being set to a second variable within the operation recorder application, generating a second line of code that when executed sets the second variable to the second value of the second object within the operation recorder application, and generating a third line of code that when executed within the operation recorder application performs the operation within the electronic document application, where the second object is referenced using the second variable in the third line of code. For example, generate code module 130 (FIG. 1) in response to event "edit cell" 318 where a value of "worksheetid: 'id2'" is not set to an alias or second variable (e.g., "sheet_2"), generates code 512 (FIG. 5) with (second line of code) "let Sheet_2=" and (third line of code) "sheet_2.getRange . . . ". In another example, generate code module 130 (FIG. 1) in response to operation 908 where "sheetID: <D1>" is not set to an alias or second variable (e.g., "sheet"), generates code 912 (second line of code) "let sheet= . . . " and code 914 (third line of code) "sheet.name . . . ". In another example, generate code module 130 (FIG. 1) in response to operation 1008 (FIG. 10) where a value of "sheetID: <id1>" is not set to an alias or second variable (e.g., "sheet") generates code 1012 (second line of code) "let sheet . . . " and code 1014 (third line of code) "Let range=sheet.getrange . . . ".

The method 1200 continues at operation 1208 with in response to the operation not generating the first object and not indicating the reference to the second object, generating a fourth line of code that when executed within the operation recorder application performs the operation within the electronic document application. For example, if operation 1204 and 1206 are not applicable, then operation 1208 is performed if there is operation received. For example, generate code module 130 (FIG. 1) may generate code 510 (FIG. 5) in response to event 314 where "newworksheet" has already been set to a value in code 508 and event 314 is not generating a new sheet (e.g., object). In another example, generate code module 130 (FIG. 1) may generate code 702 that includes code such as "sheet. getRange('A1'). values . . . " where "sheet" has already been set to a value and is not generating a new sheet (e.g., object). In another example, generate code module 130 (FIG. 1) may generate code 816 (FIG. 8) from operation 810 since "sheet" has already been set to a value and the operation 810 is not generating a newssheet.

Method 1200 may be performed on a computing device that includes a processor and memory comprising instructions which when performed by the processor, cause the processor to perform operations of method 1200. Method 1200 may include one or more additional operations. One or more of the operations of method 1200 may be optional. Method 1200 may be performed in a different order.

Figure 13:
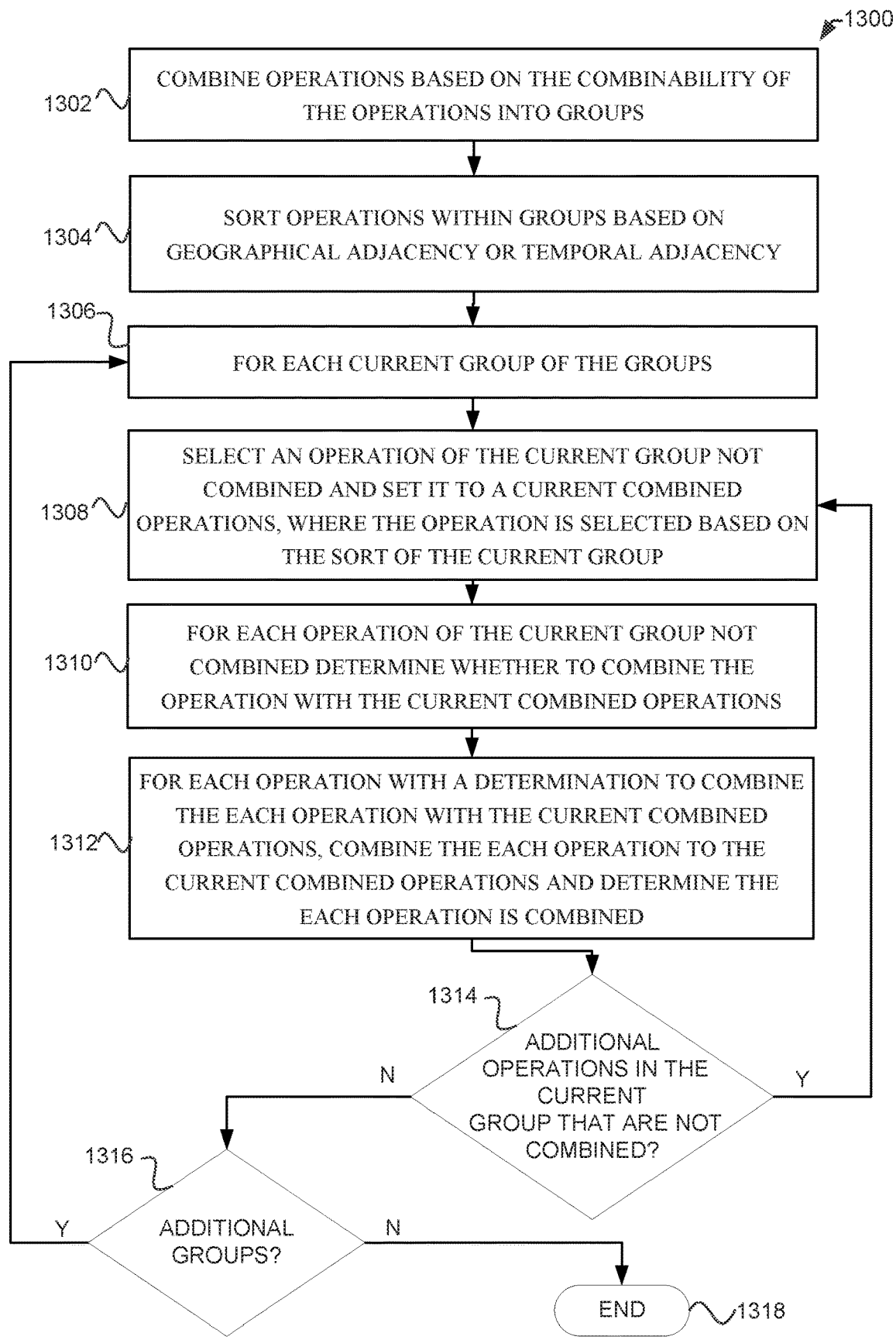
FIG. 13 illustrates a method of combining recorded operations, in accordance with some embodiments.
Figure 14:
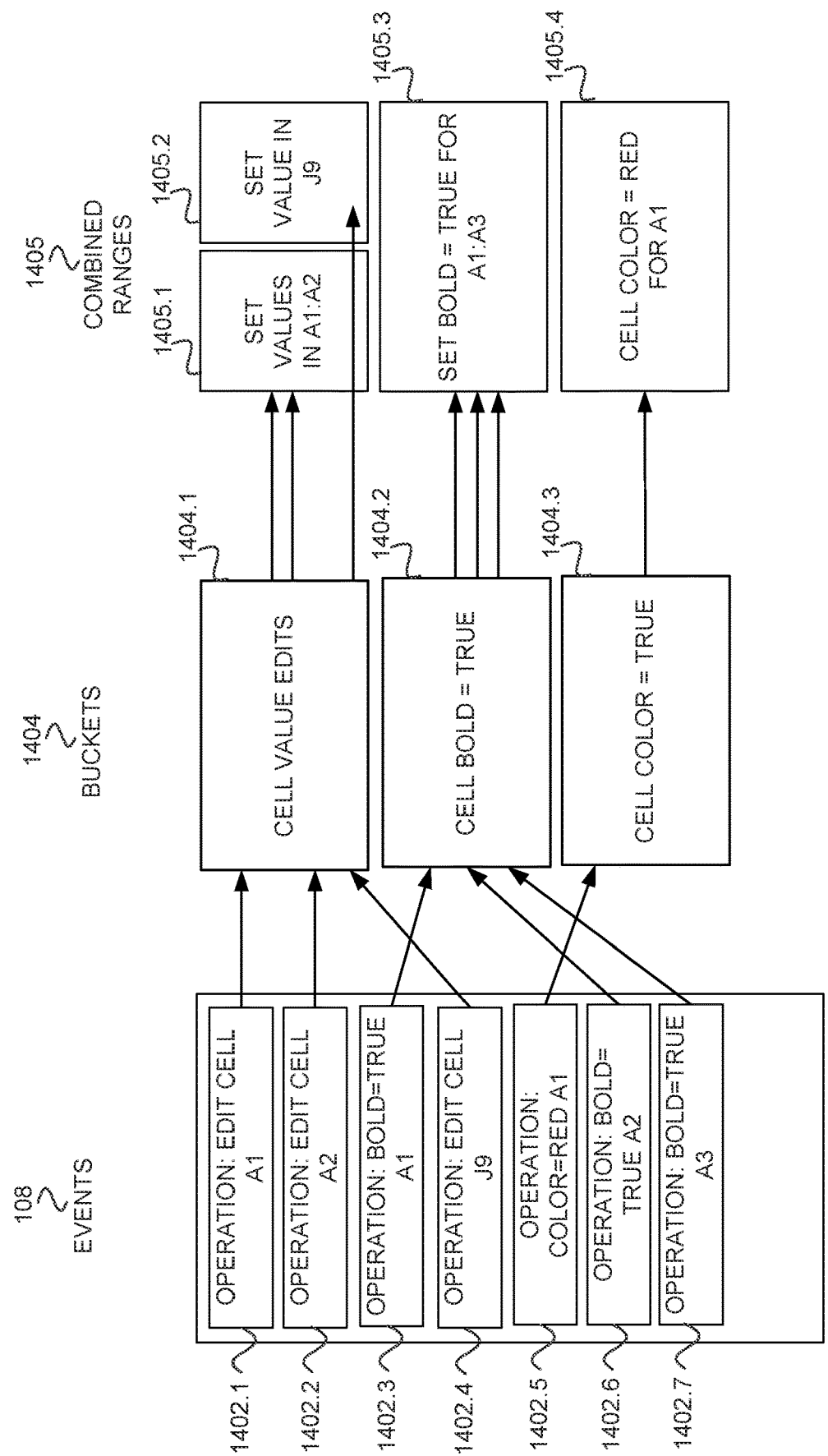
FIG. 14 illustrates the operation of a method of combining recorded operations, in accordance with some embodiments.

FIGS. 13 and 14 will be disclosed in conjunction with one another. FIG. 13 illustrates a method 1300 of combining recorded operations, in accordance with some embodiments. The method 1300 may be an embodiment of generate code 212 (FIG. 2), in accordance with some embodiments. Referring to FIG. 1, the method 1300 may be an embodiment of combining 138, in accordance with some embodiments. In some embodiments, the method 1300 begins after a stop 122 from the UI module 120. The operations 121 (or 1402 of FIG. 14) may be from a sequence of events 108 received by the recorder application 114 after a start 118 is selected from the UI module 120.

Method 1300 begins at operation 1302 with combining operations based on the combinability of the operations into groups. For example, FIG. 14 illustrates an example of operation 1302. FIG. 14 illustrates the operation of a method of combining recorded operations, in accordance with some embodiments. Illustrated in FIG. 14 is events 108, operations 1402, buckets 1404, and combined ranges 1405. Events 108 may be the same or similar as events 108 of FIG. 1. Operations 1402 may be the same or similar as operations 121 of FIG. 1. Buckets 1404 may be combined operations 1402. Combined ranges 1405 may be ranges that have been combined based on the operations 1402 that have been combined together.

Buckets 1404 may be an example of recorded operations (e.g., operations 1402) being combined based on the combinability of the operations (e.g., operations 1402) into groups (e.g., buckets 1404). The buckets 1404 may be determined based on the type 125 (FIG. 1) of operation 1402, e.g., bucket 1404.1 is of type 125 "cell value edits." The buckets 1404 may also be determined based on other factors, e.g., if there is an interruption operation 1402, then operations 1402 may be placed in separate buckets 1404 even if the operations 1402 are a same type 125. Interruptions operations 1402 may include creation of a chart, creation of a table, creation of sheet, etc.

The combinability may be based on whether the operations 1402 can have combined ranges (e.g., range 123 of FIG. 1) within the electronic document application 102. For example, the combinability may be based on whether the ranges can be combined in a range 123 of the operation 121. The combinability may depend on how many cells of a spreadsheet that are included in the range 123 are null or not operations 1402 of a same type 125. For example, there may be cells that the operations 1402 are not performed on or there may be intervening operations 1402 with a different type 125.

The combinability of operations 1402 may depend on more than just a type of the operation 121, e.g., for the operation 121 "bold", only operations that are setting the "bold" to "true" may be combinable, in accordance with some embodiments. A bucket 1404 is generated for each of the different types of operations 1402 that are combinable, e.g., as illustrated "edit", "bold", and "color". As illustrated operations 1402.1, 1402.2, and operation 1402.4 are combined into bucket "cell value edits" 1404.1; operations 1402.3, 1402.6, and 1402.7 are combined into bucket "cell bold=true" 1404.2; and, operation 1402.5 is combined into bucket "cell color=true" 1404.3.

The method 1300 may continue at operation 1304 with sorting operations within groups based on geographical adjacency or temporal adjacency. For example, operation 1402.1, 1402.2, and 1402.4 may be sorted within bucket 1404.1 based on geographic adjacency (e.g., based on the cell locations within a spreadsheet) so that operation 1402.1 is first as it references cell A1, operation 1402.2 may be second as it references cell A2, and operation 1402.4 may be last as it references cell J9. Similarly bucket 1404.2 may be sorted based on geographic adjacency. Bucket 1404.3 only has one entry. In some embodiments, the operations 1402 may be sorted based on temporal adjacency. In some embodiments, the operations 1402 may be sorted based on temporal adjacency as well as geographic adjacency. For example, if operation 1402.2 was performed after operation 1402.4 and there were several operations 1402 between the performance of operation 1402.2 and 1402.4, then operation 1402.4 may be in a sort order before operation 1402.2. In some embodiments, a new bucket 1404 may be created after a threshold number of operations 1402 so that operations 1402 that are not temporally adjacent are not combined. In some embodiments, a new bucket 1404.1 may be created if an operation is performed that separates the operations 1402, e.g., an interruption operation may separate the operations.

In some embodiments, the buckets 1404 may be determined based on user expectation, e.g., only one bucket 1404 for combinable operations 1402 performed in a sequence, e.g., cell edits or cell formats. In some embodiments, operations 1402 may be determined not to be combinable based on operations 1402 that are performed between the operations 1402. For example, if one or more predefined operations 1402 are performed between operations 1402 that would be combinable otherwise, they may be determined not to be combinable. For example, operations 1402.1 and 1402.2 are combinable as illustrated, but if they were separated by a predetermined operation, e.g., interruption operation, they may be determined not to be combinable. The predetermined operation or interruption operation may include creation of a chart, table, or sheet, or an entity edit such as chart formatting or sheet renaming. If operations 1402 that would be combinable if they were next to one another are determined to be not combinable based on operations 1402 that are intervening operations, then an additional bucket 1404 may be created with one bucket 1404 for the operations before the predetermined operation and one for the operations 1402 after the predetermined operation.

Figure 16:
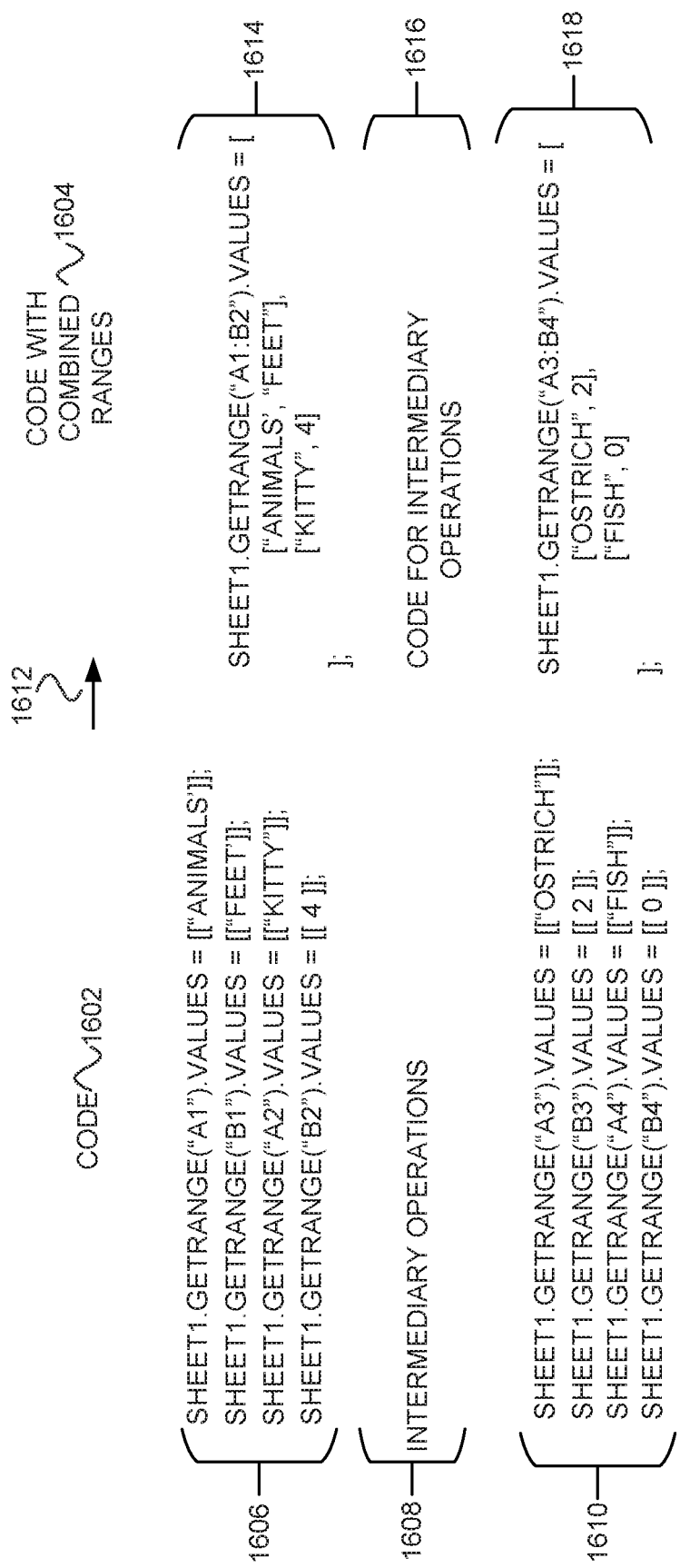
FIG. 16 illustrates the operation of a method of combining recorded operations, in accordance with some embodiments.

FIGS. 15 and 16 are disclosed in conjunction with FIGS. 13 and 14. FIG. 15 illustrates the operation of a method of combining recorded operations, in accordance with some embodiments. Illustrated in FIG. 15 is code 1502, 1508, 1510, combining recorded operations 1506, and code with combined ranges 1504, 1512, and 1514. The code 1502 is processed by combining recorded operations 1506 (e.g., 1300, 1600, 1700, 2000) that combines recorded operations 121 to generate code with combined ranges 1504. The code 1502 may be code 132 (FIG. 1). In some embodiments, the code 1502 is generated from operations 121 of events 108, and then it is optimized (e.g., combining 138). In some embodiments, combining recorded operations 1506 works an internal format (e.g., 126) before code 1502 (or code 132) is generated.

Code 1508 has operations 121 that are all combinable (e.g., the range 123 is combinable and the operations 121 are all the same type of assigning a cell a value.) Code 1510 is not all combinable. The code 1510 that includes formatting for "format.font.bold" is combinable (e.g., range 123 is combinable to "A1:B1" and the operations 121 are all of the same type) and would get a separate bucket 1404. The code 1510 for "format.fill.color" is combinable (e.g., range 123 is combinable to "A2:A4" and the operations 121 are all of the same type) and would get a separate bucket 1404. The code 1510 for "format.font.italic" is combinable (e.g., range 123 is combinable to "B2:B4" and the operations 121 are all of the same type) and would get a separate bucket 1404.

FIG. 16 illustrates the operation of a method of combining recorded operations, in accordance with some embodiments. Illustrated in FIG. 16 is code 1602, 1606, 1608, 1610, combine recorded operations 1612, and code with combined ranges 1604, 1614, 1616, and 1618. The code 1602 is processed by combine recorded operations 1612 (e.g., 1300, 1600, 1700, 2000) that combines recorded operations 1612 to generate code with combined ranges 1604.

Code 1606 and 1610 would be combinable into a range "A1:B4" with the operations 121 all being the same. However, due to intermediary operations of code 1608, the method (e.g., 1400 or another disclosed herein) determines not to combine code 1606 and code 1610, and instead generates code with combined ranges 1614, 1618. The code 1606 that includes "values" is combinable (e.g., range 123 is combinable to "A1:B2" and the operations 121 are all of the same type) and would get a separate bucket 1404, in accordance with some embodiments. The code 1610 that includes "values" is combinable (e.g., range 123 is combinable to "A3:B4" and the operations 121 are all of the same type) and would get a separate bucket 1404, in accordance with some embodiments. In some embodiments, operation 1304 of method 1300 may generate a new bucket 1404 when the intermediary operations 1608 are processed.

Method 1300 may continue at operation 1306 with for each current group of the groups. For example, referring to FIG. 14, the method 1300 may continue for each of the buckets 1404. Method 1300 may continue with selecting an operation of the current group not combined and set it to a current combined operations (there may be only one operation in current combined operations), where the operation is selected based on the sort of the current group. For example, bucket 1404.1 includes operations 1402.1, 1402.2, and 1402.4, where the operations 1402 would be sorted in that order. Operation 1402.1 would be the operation selected from the current group (bucket 1404.1). The sort may be based on the cells of a spreadsheet (e.g., FIG. 19 with a column of numbers 1902 and a row of letters 1904).

Figure 19:
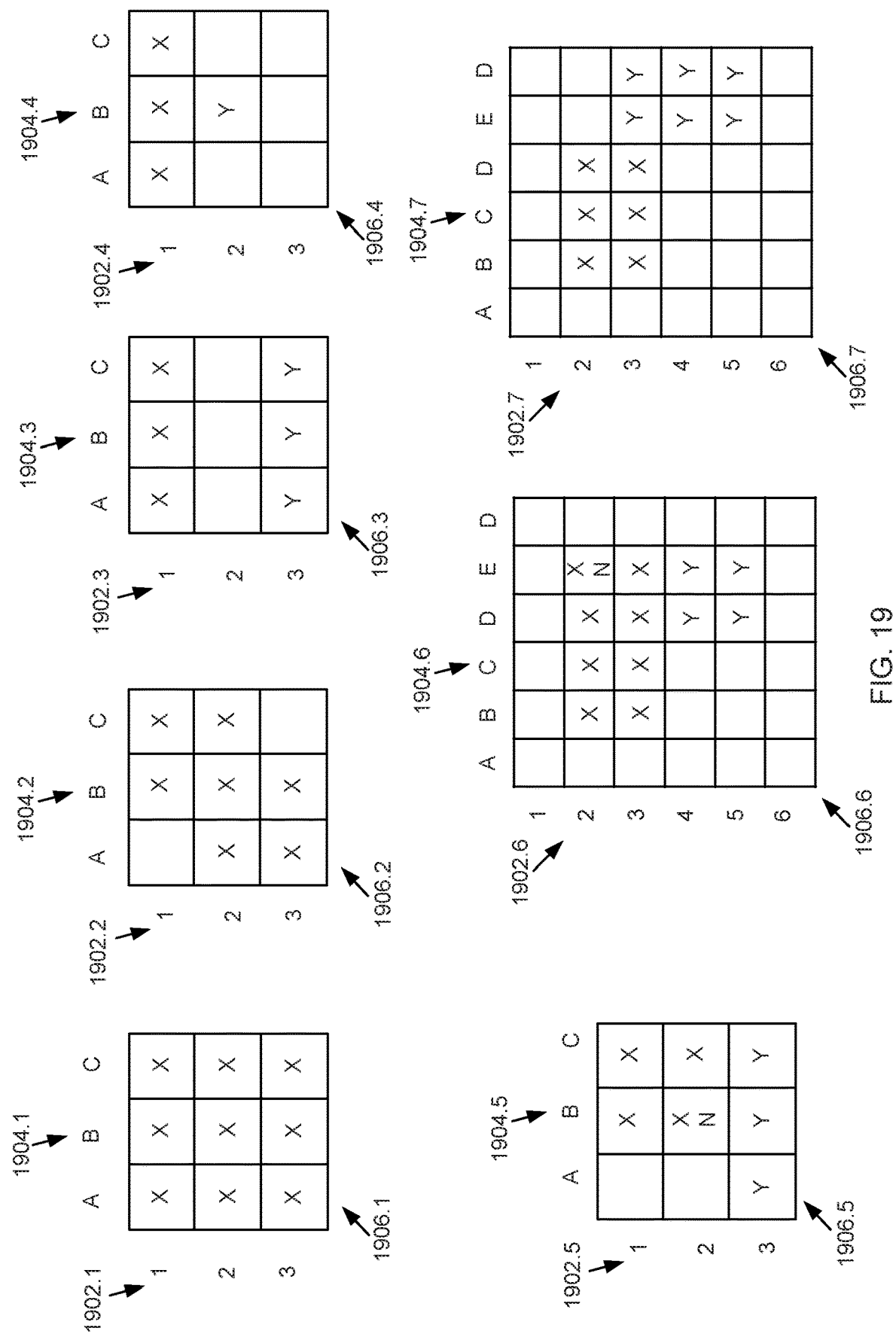
FIG. 19 illustrates the operation of a method of combining recorded operations, in accordance with some embodiments.

Method 1300 may continue at operation 1310 for each operation of the current group not combined, determine whether to combine the operation with the current combined operations. For example, referring to FIG. 14, operation 1402.1 may be the current combined operations. Generate code module 130 may determine whether operations 1402.2 and 1402.4 should be combined with operation 1402.1. Generate code module 130 may determine to combine 1402.2, but not 1402.4 since the address "J9" may not be determined to be combinable with "A1" and "A2". For example, if "J9" were combined with "A1" and "A2" then there would be too many cells that do not have an operation 1402 associated with the cell, or there may be other operations 1402 that are references the cells not referenced by an operation 1402. FIG. 19 provides examples of combining cells of a spreadsheet.

Method 1300 may continue at operation 1312 with, for each operation with a determination to combine the each operation with the current combined operations, combine the each operation to the current combined operations and determine the each operation is combined. For example, referring to FIG. 14, operation 1402.2 may be combined with operation 1402.1 to generate combined ranges 1405.1, i.e., "set values in A1:A2" where "A1:A2" may be the range 123. Operation 1402.2 may be determined to be combined.

Method 1300 continues at operation 1314 with additional operations in the current group that are not combined. For example, referring to FIG. 14, operation 1402.4 is not combined and it was in the current group. The method 1300 would return to operation 1308 where operation 1402.4 is selected to the current combined operations. Method 1300 continues at operation 1310 where nothing is done since there are no more operations 1402 in the current group. Method 1300 continues at operation 1312 where generate code module 130 may generate combined ranges 1405.2, "set value in J9" where "J9" is range 123.

Method 1300 continues at operation 1314 with additional operations in the current group that are not combined. Continuing with the example above, there are no more operations 1402 as operations 1402.1 and 1402.2 were combined into combined ranges 1405.1 and operation 1402.4 was combined with no other operation into combined ranges 1405.2. Method 1300 continues at "N" to operation 1316 with additional groups. Continuing the example of FIG. 14, there are more groups.

The method 1300 continues at "Y" to operation 1306 with for each current group of the groups. Continuing with the example above, the current group would be bucket 1404.2. The method 1300 continues at operation 1308. Continuing with the example above, the operation selected would be 1402.3 as is not combined and would be the first by a sort of the geography of a spreadsheet.

Method 1300 would continue at operation 1310. Continuing the example above, generate code module 130 would determine to combine operations 1402.6 and 1402.7 as both have ranges 123 that are combinable with operation 1402.3.

Method 1300 continues at operation 1312. Continuing the example above, generate code module 130 would generate combined ranges 1405.3 with "set bold=true for A1:A3" where "A1:A3" is the range 123. Method 1300 continues at operation 1314. Continuing the example above, there are no additional operations in the current group (bucket 1404.2).

Method 1300 continues at "N" to operation 1316 additional groups. Continuing the example above, there is one more group. Method 1300 continues to operation 1306 where the each current group is set to bucket 1404.3.

Method 1300 continues to operation 1308. Continuing the example above, there is only one operation 1402.5 in bucket 1404.3 (current group). Method 1300 continues at operation 1310. Continuing the example above, there are no more operations in bucket 1404.3 (current group). Method 1300 continues at operation 1312. Combined ranges 1403 is generated with "cell color=red for A1" where "A1" is the range 123. Continuing the example above, there are no operations that were determined to be combined.

Method 1300 continues to operation 1314. Continuing the example above, there are no additional operation 1402 in bucket 1404.2. The method 1300 continues to operation 1316. Continuing the example above, there is an additional bucket 1403.3 (additional group). The method 1300 continues to operation 1306 and then to operation 1308. Continuing the example above, operation 1402.5 is selected as it is the only operation 1402 in the bucket 1404.3 (group). The method 1300 continues to operation 1310, 1312. Continuing the example above, generate code module 130 generates combined ranges 1405.4 with "cell color=red for A1".

Method 1300 continues to operation 1314 and follows "N" since there are no additional operations in bucket 1404.3. Method 1300 continues to operation 1316 and follows "N" since there are no additional buckets 1404 after bucket 1404.3. Method 1300 may continue to end 1318.

Method 1300 may be performed on a computing device that includes a processor and memory comprising instructions which when performed by the processor, cause the processor to perform operations of method 1300. Method 1300 may include one or more additional operations. One or more of the operations of method 1300 may be optional. Method 1300 may be performed in a different order.

FIGS. 17-19 will be disclosed in conjunction with one another. FIG. 17 illustrates a method 1700 of combining recorded operations, in accordance with some embodiments. Illustrated in FIG. 17 is lines 1702. FIG. 18 illustrates a method 1800 of combining recorded operations, in accordance with some embodiments. Illustrated in FIG. 18 is lines 1802. FIG. 19 illustrates the operation of a method of combining recorded operations, in accordance with some embodiments.

Illustrated in FIG. 19 are cells 1906.1, 1906.2, 1906.3, 1906.4, 1906.5, 1906.6, and 1906.7. The cells 1906 are cells in a spreadsheet. Rows 1902 are along a vertical axis and columns 1904 are along a horizontal axis. The cells 1906 indicate which cells have operations 121 that are combinable. For example, in cells 1906.1, a letter (X in this case) at row 2 and column B indicates there is an operation 121 that has been combined with other operations 121 indicated in cells 1906.1 with an X. Referring to FIG. 15, the six lines of code 1508 that includes "A1", "A2", "B2", "A3", and "B3" would be represented by cells 1906.1 (note, though that code 1508 does not include the column 1904 C). The Xs of cells 1906.1 indicate that all the cells were combined into a range 123. Similarly, the Ys of cells 1906.6 indicate that all the cells were combined into a range 123. A letter and "N" indicates that the corresponding cell has been joined in a range even though there is no operation 121 associated with the cell. For example, E2 of cells 1906.2 is "X N", which indicates E2 is combined into a range 123 with B2, C2, D2, B3, C3, D3, and E3, but that there is no operation 121 associated with E2. In some embodiments, the cells 1906.1, 1906.2, 1906.3, 1906.4, 1906.5, 1906.6, and 1906.7 are the same or similar as buckets 1404.

In some embodiments, the method 1700 of FIG. 17 is the same or similar as methods 1300 or 2000. In some embodiments, the method 1800 of FIG. 18 is the same or similar as method 1300 or 2000. The methods 1700 and 1800 are in JScript®, in accordance with some embodiments. The methods 1700 and 1800 are in pseudo-code, in accordance with some embodiments. The method 1700 begins at line 1702.1 with a function definition where a parameter "edited_cells"

are the cells of a spreadsheet to perform the method 1700 on. For example, "edited_cells" may be operations 1402 where "edited_cells" includes an operation 121 and range 123 the operation 121 is performed on. The "edited_cells" may already be sorted into operations 121 that are combinable, e.g., edit cells, format cells, etc. The "edited_cells" may be the same or similar as buckets 1404.

The method 1700 continues with line 1702.2 that sorts "edited_cells" by column value, e.g., referring to FIG. 19, an operation 121 that references cell A1 would be before an operation that references cell B1. In some embodiments, the sort may be based on a different value than the column value, e.g., row value.

The method 1700 continues at lines 1702.3, 1702.4, and 1702.5 where each "cell" in "edited_cells" has a "used" value associated with it that indicates "false", which may be the same or similar as "combined" as disclosed in conjunction with the method 1300. Line 1702.5 initializes "cell_map" for each "cell", which may be used to map between an index of a "cell" in "edited_cells" and a "cell address." The "cell_map" may be the same or similar as cells 1906.

The method 1700 continues at line 1702.6 where "rectangles" is initialized. The method 1700 continues at lines 1702.7 through 1702.14 with a loop for each "cell" in "edited_cells". For example, the loop may be performed for each cell that has an "X" or "Y" in FIG. 19. In another example, the loop may be performed for each operation 1402 of events 108. Lines 1702.8 and 1702.9 test to see if the "cell" is used and move to the next "cell" if the cell has been used. Lines 1702.7 through 1702.14 are an embodiment of operation 1310, in accordance with some embodiments.

Line 1702.10 sets "cell" used to true so that a "cell" is only examined once. Line 1702.11 initializes a "rect" to a smallest size. Lines 1702.12 through 1702.14 attempt to grow the smallest size "rect." The "rect" is attempted to be grown "right", "down", and "up". Left is not needed because the "cells" are sorted according to columns, e.g., 1904.

When a "rect" has been grown as much as it can be (based on the thresholds of method 1800), then the "while" of line 1702.13 ends as "rectincreased" is "false", and the method 1700 moves to line 1702.7 where a next "cell" with "used" equal to "false." The method 1700 ends at line 1702.5 when all the "cells" have a "used" equal to "true."

The method 1800 tries to increase the size of the rectangle that is passed to it at line 1802.1, "rect". At line 1802.2 the "rect" is stretched by one in "direction." For example, referring to FIG. 19, A1 at cells 1906.1 may be stretched to the right, which would include B1. The A1 at cells 1906.1 may not be stretched up. The A1 at cells 1906.1 may be stretched down to include A2.

Method 1800 at line 1802.3 determines the "diffrect", which is any new cells added to the "rect". At line 1802.4 "newlycoveredcount" is the number of cells in "diffrect". At line 1802.5 "prospectivecount" is the number of cells in "stretchedrect." Lines 1802.6 and 1802.7 determine whether the "stretchedrect" covers enough edited cells. Line 1802.6 determines whether "newlycoveredcount" is less than 0.4 times "cells in diffract". In some embodiments, a different threshold may be used other than 0.4, e.g., a threshold chosen within the range of 0.2 through 0.9. Line 1802.7 determines whether "prospectivecount" is less than 0.7 times "cells in stretchedrect". In some embodiments, a different threshold may be used other than 0.7, e.g., a threshold chosen within the range of 0.2 through 0.9. Lines 1802.8 through 1802.11 are performed if there is a determination to stretch the "rect". Cells "used" is marked as "true" and "rect" is increased to include "stretchedrect."

The following are examples of methods 1700 and 1800 being performed on cells of a spreadsheet. Referring to FIG. 19, at cells 1906.5, if the current "rect" is B1 and C1 with a direction of "down", then "stretchedrect" is B1, C1, B2, and C2; the "diffrect" would be B2 and C2; "newlycoveredcout" would be 1 (i.e., B2); and "prospectivecourt" would be 3, i.e., B1, C1, and C2. At line 1802.6, the test would be "if 1<0.4*2", which is false. At line 1802.7, the test would be 3<0.7*4 (cells in stretchedrect), which is false. The method 1700 would continue to line 1802.8 where "used" for each "cell" in "diffract" is set to "true", and "rect" is increased to include "stretcheddirect." Continuing with the example above, "rect" would be set to B1, C1, B2, and C2 of 1906.5. B2 does not have an operation 121 associated with it so it is not an edited cell. Method 1700 would return "true" to method 1800, which would call method 1700 again to try to expand the "rect" with "down."

In some embodiments, the value of 0.5 (plus delta or "<" changed to "<=") may be used as a threshold in line 1802 so that the rectangle is not expanded to include one empty cell and one edited cell (e.g., as in the example above with cells 1906.5 with "rect" B1 and C1 being expanded to B1, C1, B2, and C2 when C2 is an edited cell, but B2 is not an edited cell.

In some embodiments, methods 1700 and 1800 may determine to readjust "rect". For example, referring to cells 1906.4, "rect" may be A1 to start, and then B1 may be added with "right", then A2 and B2 may be added with "down." Then C1 and C2 would be attempted to be added with "right". But "rect" A1, B1, C1, A2, B2, and C2 may fail the test at line 1802.7, since "prospectivecount" (4) is less than 0.7 times "cells in stretchedrect" (6), i.e., 4<4.2. This would mean that C1 would not be added. C1 would then be a second rectangle. However, method 1700 or method 1800 (or another method) may determine to readjust the "rectangles". For example, methods 1700 and 1800 may determine rectangle A1, B1, A2, B2, should be readjusted because of the empty space at A2 or C2. The rectangles may then be readjusted (as illustrated at 1906.4) to "X" rectangle of A1, B1, and C1, and the rectangle "Y" of B2.

Figure 20:
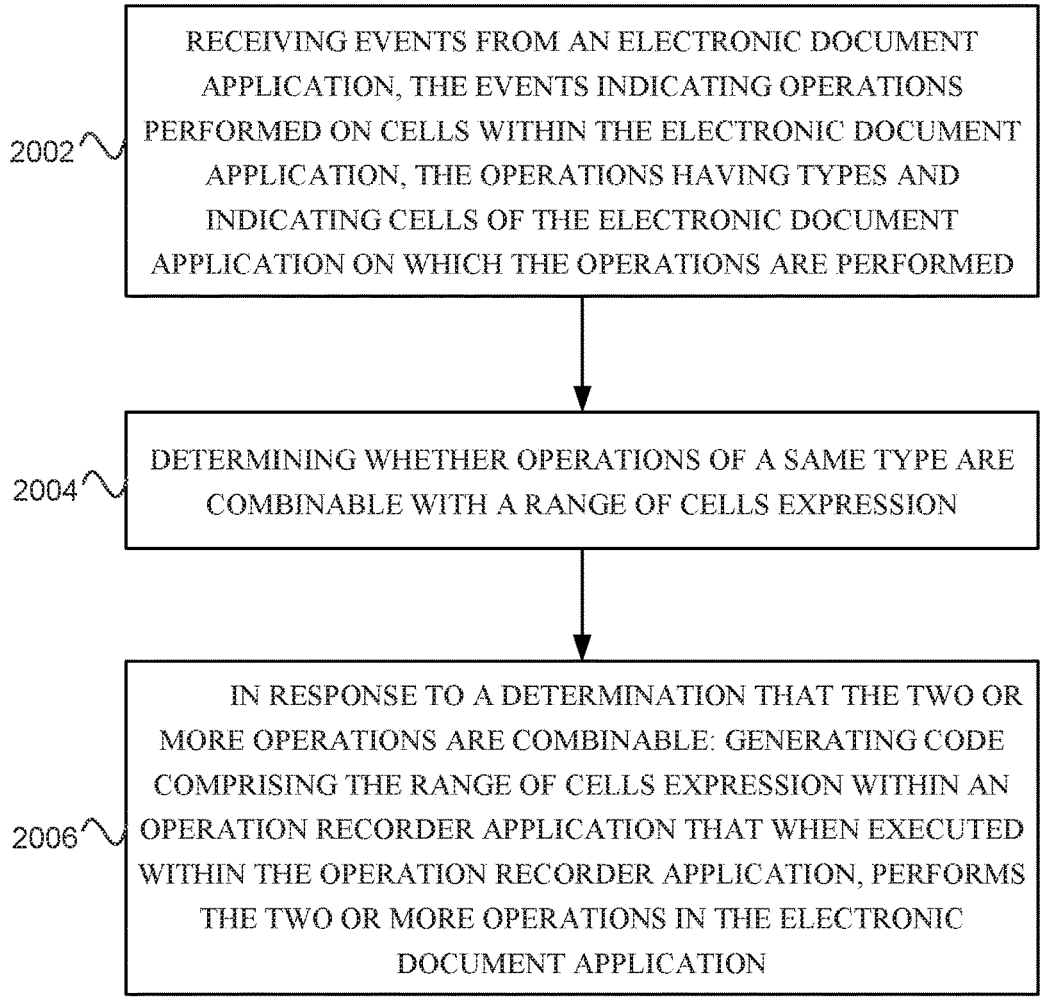
FIG. 20 illustrates a method of combining recorded operations, in accordance with some embodiments.

FIG. 20 illustrates a method 2000 of combining recorded operations, in accordance with some embodiments. The method 2000 begins at operation 2002 with receiving events from an electronic document application, the events indicating operations performed on cells within the electronic document application, the operations having types and indicating cells of the electronic document application on which the operations are performed.

For example, referring to FIG. 1, recorder application 114 may receive event 108 from electronic document application where the event 108 indicates an operation 121. In another example, referring to FIG. 3, recorder application 114 may receive events 108 with indications of operations within electronic document application 102, e.g., add sheet 310. In another example, referring to FIGS. 8, 9, and 10, application 102 may receive operations 802, 902, 1002, from electronic document application 102. In another example, referring to FIG. 2, method 200 may be performed by recorder application 114 where at operation 206 an event that includes an operation 121 is received from electronic document application 102. In another example, method 1302 may have received operations 1402 from recorder application 114.

Method 2000 continues at operation 2004 with determining whether operations of a same type are combinable with a range of cells expression. For example, method 1300 determines whether operations of a same type are combinable with a range of cells expression. In another example, combined ranges 1405, 1504, and 1604 may be the result of applying method 1300, 1700, 1800, or 2000. The methods 1700 and 1800 may be used to determined whether operation of a same type are combinable with a range of cells expression. In another example, FIG. 19 illustrates cells 1906 where the combinability of operations with a same type are determined. In another example, combining 138 may determine whether operations 121 received from events 108 are combinable with a range 123.

Method 2000 continues at operation 2006 with in response to a determination that the two or more operations are combinable: generating code comprising the range of cells expression within an operation recorder application that when executed within the operation recorder application, performs the two or more operations in the electronic document application. In an example, generate code module 130 or combining 138 may determine whether operations 121 received from events 108 are combinable with a range 123. FIG. 14 illustrates partial code generated at combined ranges 1405. FIG. 15 illustrates code with combined ranges 1504 with a line of code, e.g., 1512 and 1514. FIG. 16 illustrates code with combined ranges 1604 with a line of code, e.g., 1614, 1616, and 1618. In some embodiments, the code may be a single line of code.

Method 2000 may be performed on a computing device that includes a processor and memory comprising instructions which when performed by the processor, cause the processor to perform operations of method 2000. Method 2000 may include one or more additional operations. One or more of the operations of method 2000 may be optional. Method 2000 may be performed in a different order.

Figure 21:
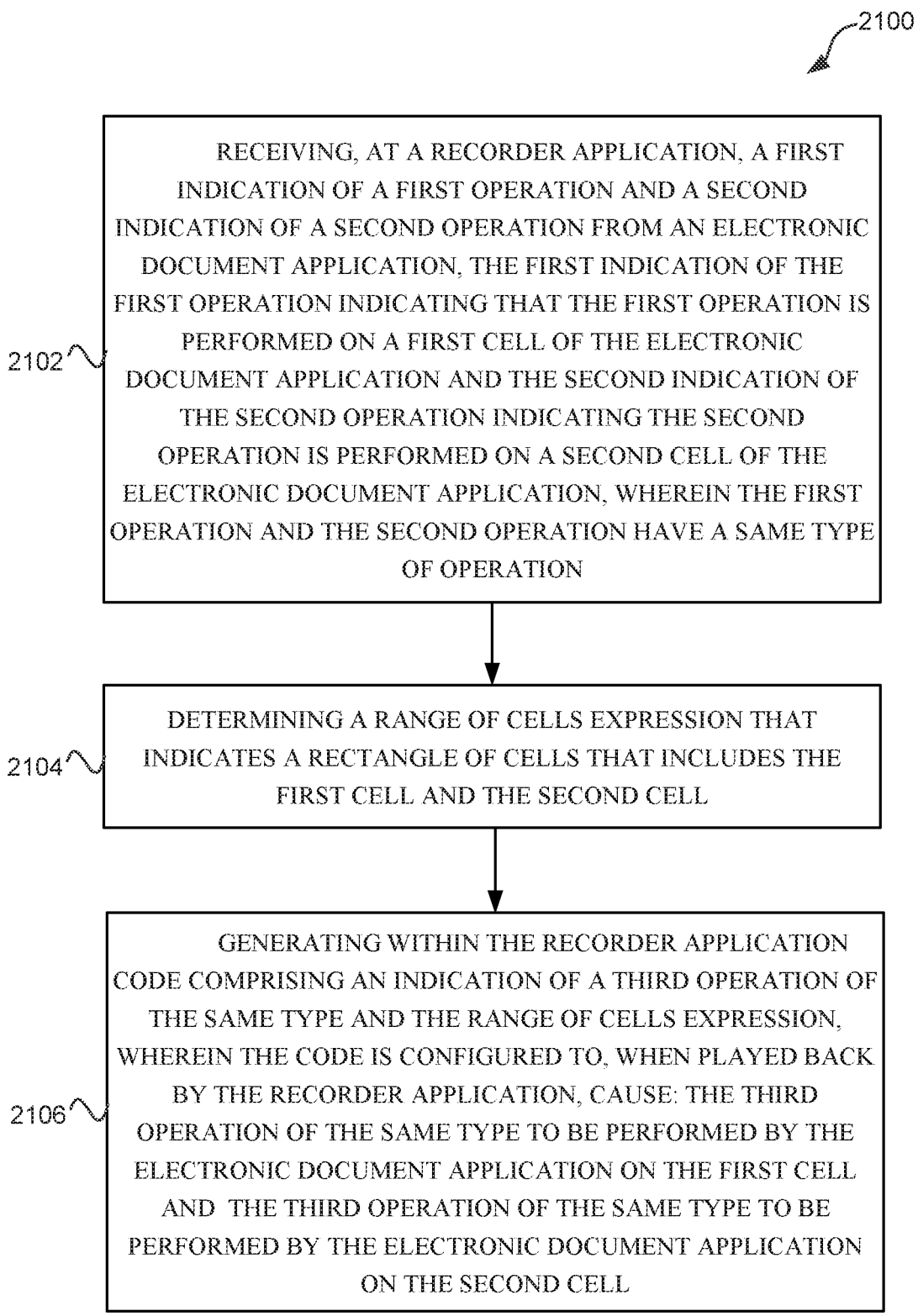
FIG. 21 illustrates a method of combining recorded operations, in accordance with some embodiments.

FIG. 21 illustrates a method 2100 of combining recorded operations, in accordance with some embodiments. The method 2100 begins at operation 2102 with receiving, at a recorder application, a first indication of a first operation and a second indication of a second operation from an electronic document application, the first indication of the first operation indicating that the first operation is performed on a first cell of the electronic document application and the second indication of the second operation indicating the second operation is performed on a second cell of the electronic document application, where the first operation and the second operation have a same type of operation.

For example, referring to FIG. 1, recorder application 114 may receive event 108 from electronic document application where the event 108 indicates an operation 121. In another example, referring to FIG. 3, recorder application 114 may receive events 108 with indications of operations within electronic document application 102, e.g., add sheet 310. In another example, referring to FIGS. 8, 9, and 10, application 102 may receive operations 802, 902, 1002, from electronic document application 102. In another example, referring to FIG. 2, method 200 may be performed by recorder application 114 where at operation 206 an event that includes an operation 121 is received from electronic document application 102. In another example, method 1302 may have received operations 1402 from recorder application 114.

Method 2100 continues at operation 2104 with determining a range of cells expression that indicates a rectangle of cells that includes the first cell and the second cell. For example, determining the range of cells expression may be the same or similar as determining if two operations having a same type are combinable with a range of cells expression. For example, method 1300 determines whether operations of a same type are combinable with a range of cells expression. In another example, combined ranges 1405, 1504, and 1604 may be the result of applying method 1300, 1700, 1800, or 2000. The methods 1700 and 1800 may be used to determine whether operation of a same type are combinable with a range of cells expression. In another example, FIG. 19 illustrates cells 1906 where the combinability of operations with a same type are determined. In another example, combining 138 may determine whether operations 121 received from events 108 are combinable with a range 123.

Method 2100 continues at operation 2106 with generating within the recorder application code comprising an indication of a third operation of the same type and the range of cells expression, wherein the code is configured to, when played back by the recorder application, cause: the third operation of the same type to be performed by the electronic document application on the first cell and the third operation of the same type to be performed by the electronic document application on the second cell.

In an example, generate code module 130 or combining 138 may determine whether operations 121 received from events 108 are combinable with a range 123. FIG. 14 illustrates partial code generated at combined ranges 1405. FIG. 15 illustrates code with combined ranges 1504 with a line of code, e.g., 1512 and 1514. FIG. 16 illustrates code with combined ranges 1604 with a line of code, e.g., 1614, 1616, and 1618. In some embodiments, the code may be a single line of code.

Method 2100 may be performed on a computing device that includes a processor and memory comprising instructions which when performed by the processor, cause the processor to perform operations of method 2100. Method 2100 may include one or more additional operations. One or more of the operations of method 2100 may be optional. Method 2100 may be performed in a different order.

Figure 22:
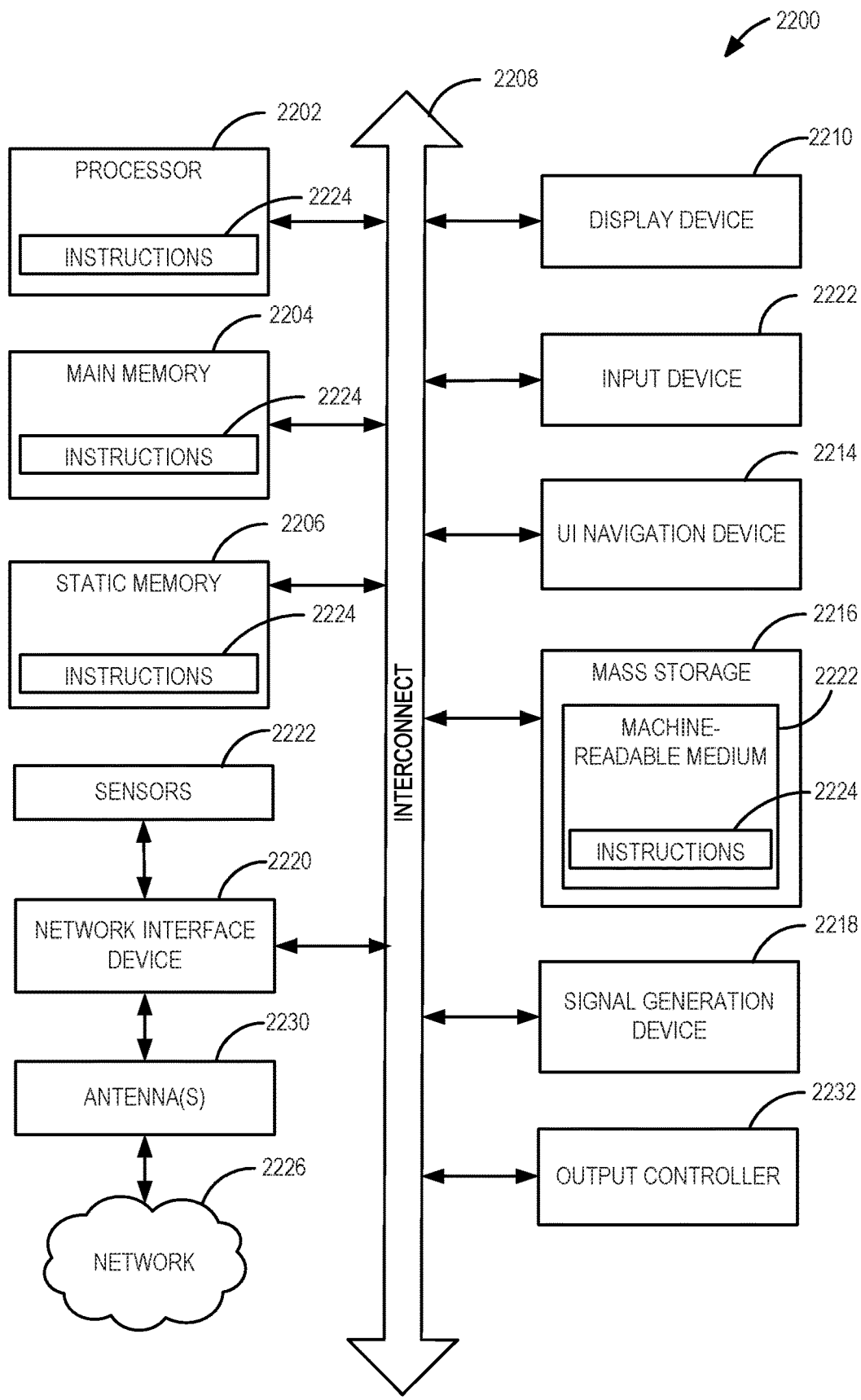
FIG. 22 illustrates a block diagram of an example machine upon which any one or more of the techniques (e.g., methodologies) discussed herein may perform.

FIG. 22 illustrates a block diagram of an example machine 2200 upon which any one or more of the techniques (e.g., methodologies) discussed herein may perform. In alternative embodiments, the machine 2200 may operate as a standalone device or may be connected (e.g., networked) to other machines. In a networked deployment, the machine 2200 may operate in the capacity of a server machine, a client machine, or both in server-client network environments. In an example, the machine 2200 may act as a peer machine in peer-to-peer (P2P) (or other distributed) network environment. The machine 2200 may be a server, personal computer (PC), a tablet PC, a set-top box (STB), a personal digital assistant (PDA), a portable communications device, a mobile telephone, a smart phone, a web appliance, a network router, switch or bridge, or any machine capable of executing instructions (sequential or otherwise) that specify operations to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 2200 may include a hardware processor 2202 (e.g., a central processing unit (CPU), a graphics processing unit (GPU), a hardware processor core, or any combination thereof), a main memory 2204 and a static memory 2206, some or all of which may communicate with each other via an interlink (e.g., bus) 2208.

Specific examples of main memory 2204 include Random Access Memory (RAM), and semiconductor memory devices, which may include, in some embodiments, storage locations in semiconductors such as registers. Specific examples of static memory 2206 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 2200 may further include a display device 2210, an input device 2212 (e.g., a keyboard), and a user interface (UI) navigation device 2214 (e.g., a mouse). In an example, the display device 2210, input device 2212 and UI navigation device 2214 may be a touch screen display. The machine 2200 may additionally include a mass storage (e.g., drive unit) 2216, a signal generation device 2218 (e.g., a speaker), a network interface device 2220, and one or more sensors 2221, such as a global positioning system (GPS) sensor, compass, accelerometer, or other sensor. The machine 2200 may include an output controller 2232, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 2202 and/or instructions 2224 may comprise processing circuitry and/or transceiver circuitry.

The storage device 2216 may include a machine readable medium 2222 on which is stored one or more sets of data structures or instructions 2224 (e.g., software) embodying or utilized by any one or more of the techniques or functions described herein. For example, one or more of electronic document application 102, recorder application 114, or macro recorder 116 may be implemented by machine 2200 to form a special purpose machine 2200. The instructions 2224 may also reside, completely or at least partially, within the main memory 2204, within static memory 2206, or within the hardware processor 2202 during execution thereof by the machine 2200. In an example, one or any combination of the hardware processor 2202, the main memory 2204, the static memory 2206, or the storage device 2216 may constitute machine-readable media. Example machine-readable medium may include non-transitory machine-readable medium that may include tangible non-transitory medium for storing information in a form readable by one or more computers, such as but not limited to read only memory (ROM); random access memory (RAM); magnetic disk storage media; optical storage media: a flash memory, etc.

Specific examples of machine-readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 2222 is illustrated as a single medium, the term "machine readable medium" may include a single medium or multiple media (e.g., a centralized or distributed database, and/or associated caches and servers) configured to store the one or more instructions 2224.

The instructions 2224 may further be transmitted or received over a communications network 2226 using a transmission medium via the network interface device 2220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, Licensed Assisted Access (LAA), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 2220 may include one or more physical jacks (e.g., Ethernet, coaxial, or phone jacks) or one or more antennas to connect to the communications network 2226. In an example, the network interface device 2220 may include one or more antennas 2230 to wirelessly communicate using at least one of single-input multiple-output (SIMO), multiple-input multiple-output (MIMO), or multiple-input single-output (MISO) techniques. In some examples, the network interface device 2220 may wirelessly communicate using Multiple User MIMO techniques. The term "transmission medium" shall be taken to include any intangible medium that is capable of storing, encoding or carrying instructions for execution by the machine 2200, and includes digital or analog communications signals or other intangible medium to facilitate communication of such software.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The following examples pertain to further embodiments. Example 1 is a computing device, the computing device including: a processor; a memory, comprising instructions, which when performed by the processor, cause the processor to perform operations including receiving an event from an electronic document application, the event indicating an operation within the electronic document application; in response to the operation indicating generation of a first object within the electronic document application, and generating a first line of code that when executed within an operation recorder application generates the first object within the electronic document application and sets a first variable to a first value of the first object within the operation recorder application.

In some embodiments, the instructions further cause the processor to perform operations including: in response to the operation indicating a reference to a second object within the electronic document application and a second value of the second object not being set to a second variable within the operation recorder application: generating a second line of code that when executed sets the second variable to the second value of the second object within the operation recorder application: and generating a third line of code that when executed within the operation recorder application performs the operation within the electronic document application, wherein the second object is referenced using the second variable in the third line of code; and in response to the operation not generating the first object and not indicating the reference to the second object: generating a fourth line of code that when executed within the operation recorder application performs the operation within the electronic document application.

In Example 2, the subject matter of Example 1 can optionally include where the instructions further cause the processor to perform operations including in response to the operation indicating the reference to the second object within the electronic document application and the second value of the second object being set to the second variable within the operation recorder application, generating a fifth line of code that when executed within the operation recorder application performs the operation within the electronic document application, wherein the second object is referenced using the second variable in the fifth line of code.

In Example 3, the subject matter of Example 1 can optionally include where the operation is a user interface operation of the electronic document application.

In Example 4, the subject matter of Example 1 can optionally include where the instructions further cause the processor to perform operations including: generating a globally unique identifier or a universally unique identifier; and assigning the globally unique identifier or the universally unique identifier to the name of the first variable.

In Example 5, the subject matter of Example 1 can optionally include wherein the instructions further cause the processor to perform operations including: generating a node of a code tree for the operation, wherein a code portion is associated with the node, and where the code portion comprises a placeholder for the variable; and processing the code tree into the code, where the placeholder is replaced with the name of the first variable or the second variable.

In Example 6, the subject matter of Example 1 can optionally include where the processing the code is performed by traversing the code tree inorder. In Example 6, the subject matter of Example 1 can optionally include where the first object or the second object is one of the following group: a table, a sheet, and a chart.

In Example 8, the subject matter of Example 1 can optionally include where the instructions further cause the processor to perform operations including: in response to the operation indicating activation or selection of the first object within the electronic document application, generating the first code to refrain from including code that recites activating or selecting the object.

In Example 9, the subject matter of Example 1 can optionally include where the instructions further cause the processor to perform operations including: receiving another event from the electronic document application, the another event indicating another operation within the electronic document application: generating additional code that when executed performs the another operation within the electronic document application; in response to the another operation indicating generation of another object within the electronic document application, generating the additional code to include additional code to set another variable within the additional code to another value of the another object; and in response to the another operation indicating a change to the another object, generating the additional code to perform the another operation with a reference to another name of the another variable.

In Example 10, the subject matter of Example 1 can optionally include where the electronic document application is a spreadsheet application, and wherein the instructions further cause the processor to perform operations including: in response to receiving a start recorder event, fetching names of sheets, tables, and a selected sheet in a workbook of the spreadsheet application; and storing the names of the sheets, tables, and the selected sheet.

In Example 11, the subject matter of Example 10 can optionally include where the instructions further cause the processor to perform operations including: generating a name of the first variable based on the names of the sheets, tables, and the selected sheet.

In Example 12, the subject matter of Example 1 can optionally include where the code is JavaScript. In Example 13, the subject matter of Example 1 can optionally include where the first line of code uses an application program interface (API) for the electronic document application to perform the first operation within the electronic document application. In Example 14, the subject matter of Example 1 can optionally include where the event is a first event of a sequence of events.

In Example 15, the subject matter of Example 1 can optionally include where the instructions further cause the processor to perform operations including: in response to the operation indicating a reference to a third object within the electronic document application and a third value of the third object not being set to a third variable within the operation recorder application, generating a third line of code that when executed sets the third variable to the third value of the third object within the operation recorder application.

Example 16 is a computer-readable storage medium that stores instructions for execution by one or more processors of a computing device, the instructions to configure the one or more processors to: receive an event from an electronic document application, the event indicating an operation within the electronic document application; in response to the operation indicating generation of a first object within the electronic document application, generate a first line of code that when executed within an operation recorder application generates the first object within the electronic document application and sets a first variable to a first value of the first object within the operation recorder application; in response to the operation indicating a reference to a second object within the electronic document application and a second value of the second object not being set to a second variable within the operation recorder application, generate a second line of code that when executed sets the second variable to the second value of the second object within the operation recorder application, and generate a third line of code that when executed within the operation recorder application performs the operation within the electronic document application, wherein the second object is referenced using the second variable in the third line of code; and in response to the operation not generating the first object and not indicating the reference to the second object, generating a fourth line of code that when executed within the operation recorder application performs the operation within the electronic document application.

In Example 17, the subject matter of Example 16 can optionally include where the operation is a user interface operation of the electronic document application. In Example 18, the subject matter of Example 16 can optionally include where the instructions further configure the one or more processors to: generate a globally unique identifier or a universally unique identifier; and assign the globally unique identifier or the universally unique identifier to the name of the variable.

In Example 19, the subject matter of Example 16 can optionally include wherein the instructions further configure the one or more processors to: in response to the operation indicating activation or selection of the first object within the electronic document application, generate the first line of code to refrain from including code that recites activating or selecting the object.

Example 20 is a computer-implemented method including: receiving an event from an electronic document application, the event indicating an operation within the electronic document application; generating code that when executed performs the operation within the electronic document application; in response to the operation indicating generation of an object within the electronic document application, generating the code to include code to set a variable within the code to a value of the object; and in response to the operation indicating a change to the object, generating the code to perform the operation with a reference to a name of the variable.

In Example 21, the subject matter of Example 20 can optionally include where the operation is a user interface operation of the electronic document application. In Example 20, the subject matter of Example 18 can optionally include where the computer-implemented method further comprises: in response to the operation indicating activation or selection of the object within the electronic document application, generating the code to refrain from including code that recites activating or selecting the object.

The following examples pertain to further embodiments. Example 22 is a computing device, the computing device including: a processor; a memory, including instructions, which when performed by the processor, cause the processor to perform operations including: receiving events from an electronic document application, the events indicating operations performed on cells within the electronic document application, the operations having types and indicating cells of the electronic document application on which the operations are performed; determining whether two or more of the operations having a same type are combinable with a range of cells expression; and in response to a determination that the two or more operations are combinable: generating code comprising the range of cells expression within an operation recorder application that when executed within the operation recorder application, performs the two or more operations in the electronic document application.

In Example 23, the subject matter of Example 22 can optionally include where the line of code uses an application program interface (API) of the electronic document application to perform the operations within the electronic document application.

In Example 24, the subject matter of Example 22 can optionally include where determining whether the two or more operations having the same type are combinable with the range of cells expression further includes: determining whether the two or more operations having the same type are combinable with the range of cells expression by: determining whether a rectangle of cells encloses the cells of the electronic document application on which the operations are performed; and determining whether the rectangle of cells does not enclose more than a threshold of cells on which the operations are not performed. In Example 25, the subject matter of Example 24 can optionally include where the electronic document application is a spreadsheet and the cells are part of a grid of a spreadsheet.

In Example 26, the subject matter of Example 22 can optionally include where the instructions further cause the processor to perform operations comprising: grouping operations having the same type into a group; sorting the operations having the same type within the group; selecting a first sorted operation of the sorted operations; stretching a one-by-one rectangle of a cell indicated by the first sorted operation by one cell to a right direction, an up direction, or a down direction; determining whether the stretched one-by-one rectangle comprises less than a threshold of cells not indicated by the first sorted operation or another operation having the same type within the group; in response to a determination that the stretched one-by-one rectangle comprises less than the threshold of cells, determining to stretch the stretched one-by-one rectangle, and determining the range of cells expression to include the stretched one-by-one rectangle; and in response to a determination that the stretched one-by-one rectangle comprises more than the threshold of cells, determine not to stretch the stretched one-by-one rectangle.

In Example 27, the subject matter of Example 22 can optionally include where an operation of the operations is one from the following group: bold, set color, cell value edits, and set background color. In Example 28, the subject matter of Example 22 can optionally include where the instructions further cause the processor to perform operations comprising: determining the two or more operations having the same type are not combinable with the range of cells expression if more than a threshold of operations of a different type are received between the two or more operations having the same type.

In Example 29, the subject matter of Example 22 can optionally include where determining whether two or more operations having the same type are combinable with the range of cells expression further includes: grouping operations based on the type into a plurality of groups; and determining whether two or more operations of a same group of the plurality of groups are combinable with the range of cells expression.

In Example 30, the subject matter of Example 22 can optionally include where the events are a sequence of operations performed in an order by a user, and wherein determining whether two or more operations of the same type are combinable with the range of cells expression further includes: grouping together operations that are not interrupted in the sequence of operations by an interruption operation, wherein the interruption operation is one of the following group: creation of a chart, creation of a table, and creation of sheet; and determining whether two or more operations having the same type and of a same group are combinable with the range of cells expression.

In Example 31, the subject matter of Example 22 can optionally include where the range of cells expression comprises an expression that indicates a rectangle of cells of a spreadsheet. In Example 32, the subject matter of Example 22 can optionally include where at least one cell indicated by the range of cells expression is not indicated by an operation of the same type. In Example 33, the subject matter of Example 32 can optionally include where the line of code indicates a null value for the at least one cell not indicated by the operation of the same type.

In Example 34, the subject matter of Example 22 can optionally include where the instructions further cause the processor to perform operations comprising: in response to a determination that the two or more operations having the same type are not combinable with the range of cells expression, generating a separate line of code for each of the two or more operations.

In Example 35, the subject matter of Example 22 can optionally include where the instructions further cause the processor to perform operations comprising: in response to a determination that the two or more operations are combinable with the range of cells expression, determining whether an additional two or more operations having an additional same type are combinable with an additional range of cells expression; and in response to a determination that the additional two or more operations are combinable with the additional range of cells expression, generating an additional line of code within the operation recorder application that when executed within the operation recorder application performs within the electronic document application the additional two or more operations having the additional same type that are combinable, the additional line of code comprising the additional range of cells expression.

In Example 36, the subject matter of Example 22 can optionally include where determining whether two or more operations having the same type are combinable with the range of cells expression further comprises: grouping operations based on the type into a plurality of groups; and for each group of the plurality of groups, determining one or more range of cells expressions that includes each operation in each group, and for each of the one or more range of cells expressions generating a line of code within the operation recorder application that when executed within the operation recorder application performs within the electronic document application operations that are included in a corresponding range of cells expression of the one or more range of cells expressions, the line of code comprising the corresponding range of cells expression.

Example 37 is a method performed on a computing device, the method including: receiving events from an electronic document application, the events indicating operations performed on cells within the electronic document application, the operations having types and indicating cells of the electronic document application on which the operations are performed; determining whether two or more of the operations having a same type are combinable with a range of cells expression; and in response to a determination that the two or more operations are combinable with the range of cells expression, generating a line of code within an operation recorder application that when executed within the operation recorder application performs within the electronic document application the two or more operations having the same type that are combinable, the line of code comprising the range of cells expression.

In Example 38, the subject matter of Example 37 can optionally include where the line of code uses an application program interface (API) of the electronic document application to perform the operations within the electronic document application.

Example 39 is a computer-readable storage medium that stores instructions for execution by one or more processors of a computing device, the instructions to configure the one or more processors to: receive events from a spreadsheet, the events indicating operations performed on cells of the spreadsheet, the operations having types; determine whether cells that are operated on by operations of a same type are combinable into a range of cells; and in response to a determination that the cells operated on by operations of the same type are combinable into the range of cells, generate macrocode to combine the operations of the same type that reference cells within the range of the cells into a single operation that indicates the range of cells is to be operated on by the single operation.

In Example 40, the subject matter of Example 39 can optionally include where an operation of the operations is one from the following group: bold, set color, cell value edits, and set background color.

In Example 41, the subject matter of Example 39 can optionally include where the instructions further configure the one or more processors to: in response to a first cell operated on by a first operation of a first type and a second cell operated on by a second operation of the first type being adjacent, combine the first cell and the second sell into the range of cells, wherein the first operation and the second operation are each one of the operations of the same type.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

What is claimed is:

1. A computing device, the computing device comprising:
   a hardware processor;
   a memory, comprising instructions, which when performed by the hardware processor, cause the processor to perform operations comprising:
   receiving, at a recorder application, a first indication of a first operation and a second indication of a second operation from an electronic document application, the first indication of the first operation indicating that the first operation is performed on a first cell of the electronic document application and the second indication of the second operation indicating the second operation is performed on a second cell of the electronic document application;
   first determining the first operation and the second operation are an equivalent type and are included in a predefined list of combinable operation types;
   second determining a range of cells expression that indicates a rectangle of cells that includes the first cell and the second cell; and
   in response to the first determining, generating, within the recorder application, code that is configured to, when played back by the recorder application perform, by the electronic document application, a combined third operation of the equivalent type on the first cell and the second cell.

2. The computing device of claim 1, wherein the code uses an application program interface (API) of the electronic document application to cause the third operation to be performed by the electronic document application on the first cell and the third operation to be performed by the electronic document application on the second cell.

3. The computing device of claim 1, wherein the rectangle of cells does not enclose more than a threshold number of cells that are not the first cell or the second cell.

4. The computing device of claim 3, wherein the electronic document application is a spreadsheet and the cells are part of a grid of a spreadsheet.

5. The computing device of claim 1, the operations further comprising:
receiving a first event, the first event comprising a fourth indication of a fourth operation, the fourth indication of the fourth operation indicating that the fourth operation is performed on a fourth cell of the electronic document application;
receiving a second event, the second event comprising an interruption indication of an interruption operation, wherein the interruption operation is one creation of a chart, creation of a table, and creation of sheet;
receiving a third event, the third event comprising an fifth indication of a fifth operation, the fifth indication of the fifth operation indicating that the fifth operation is performed on a fifth cell of the electronic document application;
determining a second range of cells expression that indicates a second rectangle of cells that includes the fourth cell;
generating within the recorder application second code comprising an indication of the third operation of the equivalent type and the second range of cells expression, wherein the second code is configured to, when played back by the recorder application, cause: the third operation of the equivalent type to be performed by the electronic document application on the fourth cell;
determining a third range of cells expression that indicates a third rectangle of cells that includes the fifth cell; and
generating, within the recorder application, third code configured to, when played back by the recorder application, cause: the third operation of the equivalent type to be performed by the electronic document application on the fifth cell.

6. The computing device of claim 1, the operations further comprising:
receiving, at the recorder application, a fourth indication of a fourth operation and a fifth indication of a fifth operation from the electronic document application, the fourth indication of the fourth operation indicating that the fourth operation is performed on a fourth cell of the electronic document application and the fifth indication of the fifth operation indicating the fifth operation is performed on a fifth cell of the electronic document application;
determining that the fourth operation and the fifth operation have an equivalent second type;
receiving, at the recorder application, less than a threshold number of indications of additional operations from the electronic document application, the less than the threshold number of indications of additional operations indicating additional operations performed on additional cells of the electronic document application, the less than the threshold number of fifth operations indicating the additional cells of the electronic document application on which the less than the threshold number of additional operations are performed, wherein the less than the threshold number of indications of additional operations are received between the fourth indication of the fourth operation and the fifth indication of the fifth operation;
determining a second range of cells expression that indicates a second rectangle of cells that includes the fourth cell and the fifth cell; and
generating, within the recorder application, second code configured to, when played back by the recorder application:
perform a sixth operation of the equivalent second type to be performed by the electronic document application on the fourth cell and
the fifth cell.

7. The computing device of claim 1, wherein the first operation and the second operation are both one of bold, set color, cell value edits, and set background color.

8. The computing device of claim 1, wherein the first cell is represented by a first coordinate pair indicating a first position of the first cell within a grid of a spreadsheet and the second cell is represented by a second coordinate pair indicating a second position of the second cell within the grid of the spreadsheet.

9. The computing device of claim 1, the operations further comprising:
receiving fourth operations from the electronic document application, the fourth operations indicating operations performed on cells within the electronic document application;
grouping fourth operations having a same second type into a group;
sorting the fourth operations having the same second type within the group;
selecting a first sorted fourth operation of the sorted fourth operations;
stretching a one-by-one rectangle of a cell indicated by the first sorted fourth operation by one cell to a right direction, an up direction, or a down direction, wherein the stretched one-by-one rectangle comprises less than a threshold number of cells not indicated by the fourth operations having the same second type;
setting a second range of cells expression to include cells indicated by the stretched one-by-one rectangle; and
generating, within the recorder application, second code configured to, when played back by the recorder application, cause a fifth operation of the same second type to be performed by the electronic document application on the cells indicated by the second range of cells expression.

10. The computing device of claim 1, wherein at least one cell indicated by the range of cells expression is not the first cell or the second cell.

11. The computing device of claim 10, wherein the code indicates the third operation is further performed on the at least one cell with a null value.

12. The computing device of claim 1, the operations further comprising:
receiving fourth operations from the electronic document application, the fourth operations performed on third cells within the electronic document application, each of the fourth operations being of a second type;

identifying intervening operations between at least two of the fourth operations; and determining two or more of the fourth operations are not combinable based on the identified intervening operations.

13. The computing device of claim 1, the operations further comprising:

receiving a fourth indication of a fourth operation, the fourth indication of the fourth operation indicating that the fourth operation is performed on a fourth cell of the electronic document application;

receiving a fifth indication of a fifth operation, the fifth indication of the fifth operation indicating that the fifth operation is performed on a fifth cell of the electronic document application;

determining a second range of cells expression that indicates a second rectangle of cells that includes the fourth cell and the fifth cell and includes more than a threshold number of cells not operated on by operations of having an equivalent type as the fourth and fifth operations;

third determining the fourth operation and the fifth operation are of the equivalent type;

in response to the third determining, generating, within the recorder application, second code configured to, when played back by the recorder application, cause the combined third operation of the equivalent type to be performed by the electronic document application on the fourth cell;

and generating within the recorder application third code configured to, when played back by the recorder application, cause the combined third operation to include the fifth cell.

14. A computer-implemented method performed on a computing device, the computer-implemented method comprising:

receiving, at a recorder application, a first indication of a first operation and a second indication of a second operation from an electronic document application, the first indication of the first operation indicating that the first operation is performed on a first cell of the electronic document application and the second indication of the second operation indicating the second operation is performed on a second cell of the electronic document application;

first determining the first operation and the second operation are an equivalent type and are included in a predefined list of combinable operation types;

second determining a range of cells expression that indicates a rectangle of cells that includes the first cell and the second cell; and in response to the first determining, generating, within the recorder application, code configured to, when played back by the recorder application perform, by the electronic document application, a combined third operation of the equivalent type on the first cell and the second cell.

15. The computer-implemented method of claim 14, wherein the code uses an application program interface (API) of the electronic document application to cause the third operation to be performed by the electronic document application on the first cell and the third operation to be performed by the electronic document application on the second cell.

16. The computer-implemented method of claim 14, wherein the computer-implemented method further comprises:

receiving a first event, the first event comprising a fourth indication of a fourth operation, the fourth indication of the fourth operation indicating that the fourth operation is performed on a fourth cell of the electronic document application;

receiving a second event, the second event comprising an interruption indication of an interruption operation, wherein the interruption operation is one of creation of a chart, creation of a table, and creation of sheet;

receiving a third event, the third event comprising an fifth indication of a fifth operation, the fifth indication of the fifth operation indicating that the fifth operation is performed on a fifth cell of the electronic document application;

determining a second range of cells expression that indicates a second rectangle of cells that includes the fourth cell;

generating, within the recorder application, second code configured to, when played back by the recorder application, cause the combined third operation to be performed by the electronic document application on the fourth cell;

determining a third range of cells expression that indicates a third rectangle of cells that includes the fifth cell; and generating within the recorder application third code comprising an indication of the third operation and the third range of cells expression, wherein the third code is configured to, when played back by the recorder application, cause: the third operation to be performed by the electronic document application on the fifth cell.

17. A computer-readable storage medium that stores instructions for execution by one or more hardware processors of a computing device, the instructions configuring the one or more hardware processors to perform operations comprising:

receive, at a recorder application, a first indication of a first operation and a second indication of a second operation from an electronic document application, the first indication of the first operation indicating that the first operation is performed on a first cell of the electronic document application and the second indication of the second operation indicating the second operation is performed on a second cell of the electronic document application;

first determine the first operation and the second operation are an equivalent type and are included in a predefined list of combinable operation types;

second determine a range of cells expression that indicates a rectangle of cells that includes the first cell and the second cell; and in response to the first determination, generate, within the recorder application, code-configured to, when played back by the recorder application perform, by the electronic document application, a combined third operation of the equivalent type on the first cell and the second cell.

18. The computer-readable storage medium of claim 17, wherein the code uses an application program interface (API) of the electronic document application to cause the third operation to be performed by the electronic document application on the first cell and the third operation to be performed by the electronic document application on the second cell.

19. The computer-readable storage medium of claim 17, wherein the rectangle of cells does not enclose more than a threshold number of cells that are not the first cell or the second cell.

20. The computer-readable storage medium of claim 19, wherein the electronic document application is a spreadsheet and the cells are part of a grid of a spreadsheet.

* * * * *

UNITED STATES PATENT AND TRADEMARK OFFICE
CERTIFICATE OF CORRECTION

PATENT NO. : 11,120,211 B2  
APPLICATION NO. : 16/392017  
DATED : September 14, 2021  
INVENTOR(S) : Gergely Kota, Raul Clouse and Ilia Pavlov Page 1 of 1

It is certified that error appears in the above-identified patent and that said Letters Patent is hereby corrected as shown below:

On the Title Page

In item (54), and in the Specification, in "Title", in Column 1, Line 1, delete "Spreadsheet"

Signed and Sealed this
Sixteenth Day of November, 2021

Drew Hirshfeld
*Performing the Functions and Duties of the*
*Under Secretary of Commerce for Intellectual Property and*
*Director of the United States Patent and Trademark Office*